(12) United States Patent
Dümpelmann et al.

(10) Patent No.: US 10,642,056 B2
(45) Date of Patent: May 5, 2020

(54) MULTISPECTRAL OR HYPERSPECTRAL IMAGING AND IMAGING SYSTEM BASED ON BIREFRINGENT SUBWAVELENGTH RESONATING STRUCTURE

(71) Applicant: CSEM Centre Suisse d'Electronique et de Microtechnique SA—Recherche et Développement, Neuchâtel (CH)

(72) Inventors: Luc Dümpelmann, Basel (CH); Benjamin Gallinet, Muttenz (CH)

(*) Notice: Subject to any disclaimer, the term of this patent is extended or adjusted under 35 U.S.C. 154(b) by 218 days.

(21) Appl. No.: 15/787,002

(22) Filed: Oct. 18, 2017

(65) Prior Publication Data
US 2018/0107015 A1    Apr. 19, 2018

Related U.S. Application Data

(60) Provisional application No. 62/409,894, filed on Oct. 19, 2016.

(51) Int. Cl.
| | | |
|---|---|---|
| *G02B 27/28* | (2006.01) | |
| *G01J 3/02* | (2006.01) | |
| *G01J 3/28* | (2006.01) | |
| *G02B 1/08* | (2006.01) | |
| *G02B 5/00* | (2006.01) | |
| *G02B 5/30* | (2006.01) | |
| *G02B 5/20* | (2006.01) | |
| *G02F 1/137* | (2006.01) | |
| *G02B 26/00* | (2006.01) | |
| *G02F 1/01* | (2006.01) | |
| *G02B 5/18* | (2006.01) | |
| *G02B 5/28* | (2006.01) | |
| *G01J 3/12* | (2006.01) | |

(52) U.S. Cl.
CPC .......... *G02B 27/288* (2013.01); *G01J 3/0224* (2013.01); *G01J 3/0256* (2013.01); *G01J 3/2803* (2013.01); *G01J 3/2823* (2013.01); *G02B 1/08* (2013.01); *G02B 5/008* (2013.01); *G02B 5/203* (2013.01); *G02B 5/3083* (2013.01); *G01J 2003/1269* (2013.01); *G01J 2003/1291* (2013.01); *G01J 2003/2826* (2013.01); *G01J 2003/2866* (2013.01); *G01J 2003/2873* (2013.01); *G02B 5/1809* (2013.01); *G02B 5/285* (2013.01); *G02B 26/007* (2013.01); *G02F 1/0136* (2013.01); *G02F 1/137* (2013.01)

(58) Field of Classification Search
CPC .... G02B 27/288; G02B 5/008; G02B 5/3083; G02B 5/30; G02B 1/08; G02B 26/007; G02B 5/203; G02B 5/1809; G02B 5/285; G02F 1/0136; G02F 1/01; G02F 1/137; G01J 3/0224; G01J 3/0202; G01J 3/0205; G01J 3/02; G01J 3/2823; G01J 2003/2826; G01J 3/0256; G01J 3/2803; G01J 2003/1269; G01J 2003/1291; G01J 2003/2866; G01J 2003/2873

See application file for complete search history.

(56) References Cited

U.S. PATENT DOCUMENTS

| | | | |
|---|---|---|---|
| 6,310,673 B1* | 10/2001 | Sharp ................... | G02B 27/288 349/106 |
| 8,125,634 B1* | 2/2012 | Nikitin .................... | G01J 1/429 250/458.1 |
| 2002/0171793 A1* | 11/2002 | Sharp ................. | C09K 19/0225 349/117 |
| 2011/0102565 A1* | 5/2011 | Wang ....................... | G01J 3/02 348/61 |
| 2011/0261441 A1* | 10/2011 | Zheludev ............... | G02B 1/005 359/352 |
| 2011/0292504 A1* | 12/2011 | Magnusson .......... | G02B 5/3083 359/485.01 |
| 2012/0092770 A1* | 4/2012 | Li ........................ | G02B 5/1809 359/572 |
| 2012/0206726 A1* | 8/2012 | Pervez ..................... | G01J 3/02 356/402 |
| 2013/0187049 A1* | 7/2013 | Collin .................... | G02B 1/005 250/338.1 |
| 2013/0323858 A1* | 12/2013 | Abdulhalim ......... | G01N 21/554 436/501 |
| 2014/0268332 A1* | 9/2014 | Guo ....................... | G02B 5/008 359/487.01 |

(Continued)

OTHER PUBLICATIONS

Bacon, Christina P., Yvette Mattley, and Ronald DeFrece. "Miniature spectroscopic instrumentation: applications to biology and chemistry." Review of Scientific instruments 75.1 (2004): 1-16.
Ellenbogen, Tal, Kwanyong Seo, and Kenneth B. Crozier. "Chromatic plasmonic polarizers for active visible color filtering and polarimetry." Nano letters 12.2 (2012): 1026-1031.
Hinnrichs, Michele, and James Jensen. "Simultaneous multispectral imaging using lenslet arrays," Proc. of SPIE vol. 8616. 2013.

(Continued)

*Primary Examiner* — John R Lee
(74) *Attorney, Agent, or Firm* — Andre Roland S.A.

(57) ABSTRACT

An angle-stable, miniaturized and integrate-able imaging system based on plasmon resonances or dielectric resonances for multispectral imaging maintaining full spatial resolution of the image sensor. Active tunability of the filter allows color recording, estimation of unknown spectra and determination of spectral singularities, for example laser lines, with the use of a conventional B/W camera. The system is characterized by high angular acceptance, cost-efficient fabrication and ease-of-use. This system can be used in conjunction with other commercial multispectral imaging systems such as RGB cameras to further enhance the spectral resolution. It can be adapted to different spectral ranges, depending on the application.

21 Claims, 12 Drawing Sheets

(56) References Cited

U.S. PATENT DOCUMENTS

| | | | |
|---|---|---|---|
| 2015/0063739 A1* | 3/2015 | Long | G02F 1/0126 385/1 |
| 2015/0124306 A1* | 5/2015 | Bartoli | G02B 5/008 359/241 |
| 2015/0177140 A1* | 6/2015 | Guo | G01N 21/554 356/328 |
| 2016/0025914 A1* | 1/2016 | Brongersma | G02B 1/002 359/489.07 |
| 2016/0077261 A1* | 3/2016 | Arbabi | G02B 5/3025 359/493.01 |
| 2016/0127661 A1* | 5/2016 | Hegyi | H04N 5/332 348/164 |
| 2016/0154229 A1* | 6/2016 | Milner | G06T 7/80 348/79 |
| 2016/0178516 A1* | 6/2016 | Abdulhalim | G01N 29/022 |
| 2016/0202178 A1* | 7/2016 | Acosta | G01N 21/27 356/303 |
| 2016/0232875 A1* | 8/2016 | Drolet | G09G 5/026 |
| 2016/0273963 A1* | 9/2016 | Herrick | G01J 3/0224 |
| 2017/0199425 A1* | 7/2017 | Nam | G02F 1/133553 |
| 2018/0107015 A1* | 4/2018 | Dumpelmann | G02B 27/288 |

OTHER PUBLICATIONS

Xu, Qiang, et al. "Electrically tunable optical polarization rotation on a silicon chip using Berry's phase." Nature communications 5 (2014): 5337.

Xu, Ting, et al. "Plasmonic nanoresonators for high-resolution colour filtering and spectral imaging." Nature communications 1.5 (2010): 59.

* cited by examiner

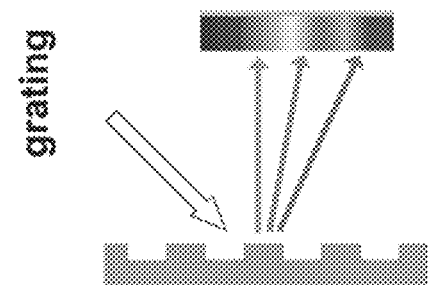
a) Scanning - Spectral
FIG.1A
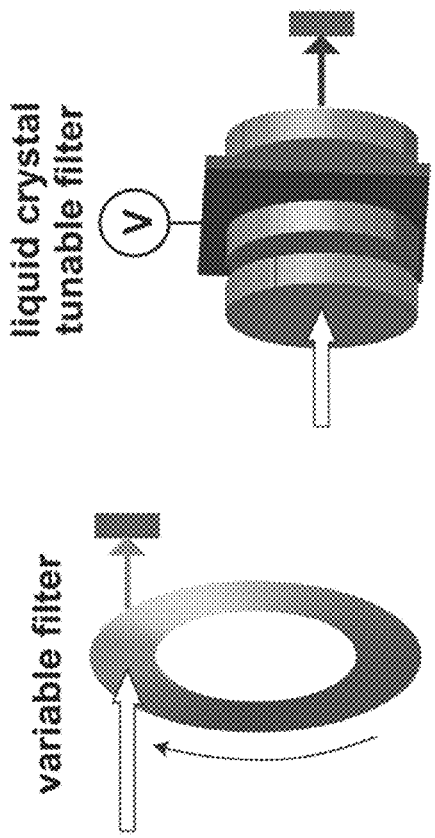
b) Scanning - Spatial
FIG.1B
c) Snapshot - Single Sensor
FIG.1C
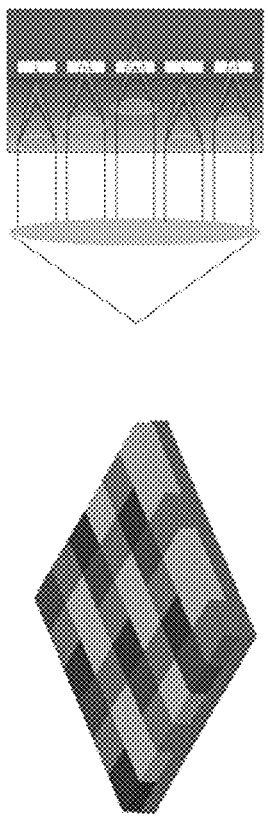
BACKGROUND ART a)

b)

| U | Eigenvalues S ch. #1 | ch. #3 |
|---|---|---|
| 1. | 5.71 | 3.80 |
| 2. | 2.11 | 2.92 |
| 3. | 0.84 | 2.20 |
| 4. | 0.0017 | 0.51 |
| 5. | 0.0014 | 0.27 |
| 6. | 0.0009 | 0.14 | a)

b)

c)

| Patch | CIE ΔE 2000 | | | RMS | | |
|---|---|---|---|---|---|---|
| | 0° | 15° | 25° | 0° | 15° | 25° |
| Red | 5.1 | 1.5 | 10.9 | 0.10 | 0.10 | 0.12 |
| orange | 9.5 | 4.4 | 14.2 | 0.12 | 0.15 | 0.16 |
| yellow | 9.4 | 4.7 | 11.5 | 0.12 | 0.07 | 0.18 |
| green | 3.9 | 2.0 | 4.1 | 0.05 | 0.05 | 0.05 |
| light blue | 2.4 | 4.6 | 3.3 | 0.07 | 0.07 | 0.08 |
| dark blue | 14.1 | 14.8 | 4.5 | 0.11 | 0.09 | 0.06 |
| purple | 7.5 | 6.6 | 5.4 | 0.12 | 0.12 | 0.11 |
| pink | 3.8 | 5.0 | 3.5 | 0.09 | 0.15 | 0.10 |
| black | 3.6 | 3.5 | 4.5 | 0.01 | 0.01 | 0.01 |
| white | 7.2 | 11.0 | 8.6 | 0.07 | 0.12 | 0.15 |
| Average | 6.7 | 5.8 | 7.1 | 0.09 | 0.09 | 0.10 |
FIG.14
a) Conventional RGB camera
b) Plasmonic Multispectral Imager
FIG.15A
FIG.15B
c)
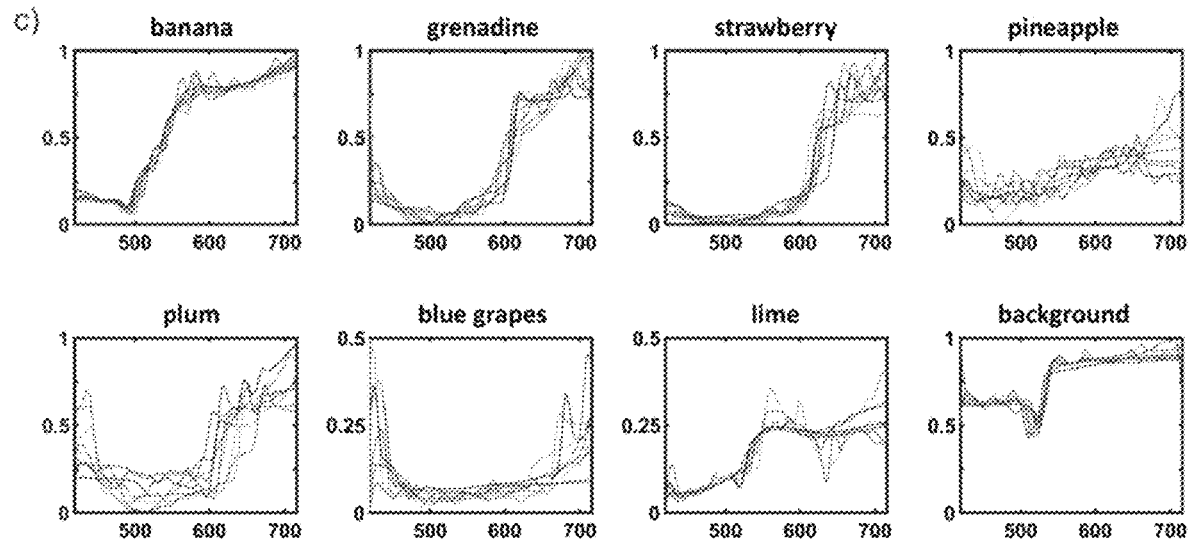
FIG.15C

MULTISPECTRAL OR HYPERSPECTRAL IMAGING AND IMAGING SYSTEM BASED ON BIREFRINGENT SUBWAVELENGTH RESONATING STRUCTURE

CROSS-REFERENCE TO RELATED APPLICATIONS

The present application claims priority to the Provisional Application with the Ser. No. 62/409,894 that was filed on Oct. 19, 2016, the entire contents thereof being herewith incorporated by reference.

FIELD OF THE INVENTION

The present invention relates to the field of tunable optical filters and imaging systems including such tunable optical filters. The invention is in the field of tunable filters, spectrometry and multispectral imaging, where the spectral dimension (wavelength), the two spatial dimensions (e.g. location) or a scene are recorded, so-called spectral image. Often this is achieved by sacrificing spatial resolution in return for spectral resolution (e.g. filter array). By using tunable and angle-stable filters, spectral images can be recording at full spatial resolution and a high field-of-view by using already existing one or more channel cameras.
DISCUSSION OF THE BACKGROUND ART Currently the demand and field of applications for imaging system with spectral analysis capability is strongly increasing. Recent markets include remote sensing, food monitoring, medical monitoring, art conservation or military applications. A great diversity of instruments with sophisticated performance is readily available. Each of the techniques used has its advantages and drawbacks, leading to field-dependent use of specific instrument types.

Some of the most important performance characteristics are the spectral, spatial and temporal resolution, defining the smallest distinguishable difference of wavelengths, the number of pixels recording an image with spectral information (spectral cube) and the duration of time required for an acquisition thereof, respectively. The field-of-view (FOV) defines the angular extent which can be recorded by the camera. Finally, characteristics such as the bulkiness, handling and expense are practical characteristics strongly limiting the range of applications.

Recording of the hyper-(>10 bands) or multispectral information or cube can be done by scanning spectrally (e.g. tunable filters or liquid crystal tunable filters (see, for example, FIG. 1A)) or spatially (e.g. gratings, see for example FIG. 1B). This often requires bulky and heavy parts or significant volume for spectral filtering.

Alternatively, the spectral cube can be recorded instantly (snapshot), but this intrinsically limits the spectral or spatial resolution (e.g. multispectral filter array or filtered lenslet array (see, for example, FIG. 1C). These systems are fixed to an imaging system and cannot be integrated onto an already existing imaging system. Most of these abovementioned techniques are based on interferometric layers for which the filtering properties strongly depend on the incident angle, reducing the FOV. To increase the spectral resolution of such filters, they have to contain pixels or lines with different spectral filtering properties. This strongly increases the complexity and cost of fabrication, restricting the range of applications. Liquid crystal tunable filters and filtered lenslet arrays are also available but these are often complex, sensitive and expensive.

There is great demand for miniaturized, cost-efficient and integrate-able systems. A possible solution to fulfil these requirements is tunable broadband filters with angle-stable transmission properties. Unfortunately, the ideal broadband filter, with high system compatibility and photo-stability has yet not been developed. Recently, systems based on colloidal quantum dots, vertical silicon nanowires or plasmonic filter patches were presented. Whereas they demonstrate a great variety of broadband filters, each pixel is addressed to one filter, limiting the spatial resolution of the image and increasing the fabrication complexity of the system. Furthermore angle-stable transmission is often not assured.

Moreover, many known multi- and hyperspectral imaging systems are based on pixel-wise filter arrays. This often requires careful alignment during the fabrication process or depending on the number of distinct spectral filters, a high increase of cost. Furthermore, they have the disadvantage that spatial resolution is sacrificed for spectral resolution.

Additionally, a large number of currently used filters (filter arrays or filters in front of an imaging system) are based on organic dyes or interference filters. Organic dyes are limited in size, can bleach and are not stable in high temperature. Filters based on interference films are often challenging to fabricate, especially for arrays, and are strongly angle-dependent, limiting the range of applications. Color wheels/variable color filters are often fabricated with an interference filter (limiting field-of-view) leading to narrow spectral band (small photon efficiency). Rotation of the filter has to be done mechanically, and the arrangement of the filter (often circular or linear) leads to a bulky system.

SUMMARY

It is therefore one aspect of the present disclosure to provide a tunable optical filter and an imaging system that overcomes the above challenges. The tunable optical filter preferably includes:
- an input polarizer for receiving incident electromagnetic radiation incident from an object, the input polarizer being configured to produce linearly polarized electromagnetic radiation;
- a phase retarder arranged to receive the linearly polarized electromagnetic radiation having first and second polarization components on two orthogonal axes, the phase retarder being configured to carry out a wavelength dependent shift of a phase of the first and/or second polarization components; and
- an analyzing polarizer arranged to receive the electromagnetic radiation output from the phase retarder, the analyzing polarizer being configured to filter said received electromagnetic radiation at a plurality of different polarization state angles $\varphi_m$ to output electromagnetic radiation having distinct spectral content at each polarization state angle $\varphi_m$.

It is another aspect of the present disclosure to provide a tunable optical filter that preferably includes:
- an analyzing polarizer for receiving electromagnetic radiation incident from an object, the analyzing polarizer being configured to filter said incident electromagnetic radiation at a plurality of different polarization state angles $\varphi_m$ and to output electromagnetic radiation at each polarization state angle $\varphi_m$;
- a phase retarder arranged to receive, from the analyzing polarizer, linearly polarized electromagnetic radiation having first and second polarization components on two orthogonal axis, the phase retarder being configured to carry out a wavelength dependent shift of a phase of the first and/or second polarization components; and an output polarizer arranged to receive the electromagnetic radiation output from the phase retarder, the output polarizer being configured to filter said received electromagnetic radiation to output linearly polarized electromagnetic radiation.

According to one aspect of the present disclosure, the phase retarder is a phase retarder comprising at least a plurality of periodically substantially aligned subwavelength structures configured to generate localized surface plasmon resonances or subwavelength dielectric resonances at a first resonance frequency when the first or second polarization component is incident on the phase retarder.

According to another aspect of the present disclosure, the phase retarder is a phase retarder comprising a plurality of periodically substantially aligned subwavelength structures configured to generate localized surface plasmon resonances or subwavelength dielectric resonances at a first resonance frequency and/or at a second resonance frequency.

According to still another aspect of the present disclosure, the phase retarder is a plasmonic phase retarder comprising at least a first plurality of periodically substantially aligned subwavelength structures configured to generate localized surface plasmon resonances at first and second resonance frequencies and a second plurality of periodically substantially aligned subwavelength structures configured to generate localized surface plasmon resonances at third and fourth resonance frequencies.

According to yet another aspect of the present disclosure, the plurality of periodically substantially aligned subwavelength structures includes subwavelength metallic nanostructures having a metallic thickness value in the range of 5 nm to 100 nm, preferably 10 nm to 50 nm, and/or a separation trench separating the metallic nanostructures having a depth in the range of 30 nm to 250 nm, preferably 30 nm to 120 nm to provide filtering in the visible spectrum.

According to still another aspect of the present disclosure, the plurality of periodically substantially aligned subwavelength structures includes a plurality of periodically substantially aligned subwavelength metallic nanostructures including subwavelength metallic nanostructures having a periodic separation in the range of 140 nm to 200 nm to provide an angle independent response of phase retarder.

According to yet another aspect of the present disclosure, the plurality of periodically substantially aligned subwavelength structures includes a plurality of periodically substantially aligned subwavelength metallic nanostructures including a first set and a second set of periodically aligned subwavelength metallic nanostructures, the first and second set of periodically aligned subwavelength metallic nanostructures comprising subwavelength metallic nanostructures having a different orientation, and/or a different metallic thickness value, and/or a different periodic separation, and/or a different separation trench depth.

In some embodiments, the input polarizer, the phase retarder and the analyzing polarizer are connected together to form an integrated compact device; or the analyzing polarizer, the phase retarder and the output polarizer are connected together to form an integrated compact device.

It is yet another aspect of the present disclosure to provide a smart phone or imaging device including the above-mentioned tunable optical filter.

It is yet another aspect of the present disclosure to provide a multispectral or hyperspectral imaging system comprising:

the above-mentioned tunable optical filter; and an image sensor including a plurality of pixels, the image sensor being arranged downstream from the tunable optical filter and being configured to record the electromagnetic radiation intensity $V_{pixel}(\varphi_m)$ of the electromagnetic radiation output from the output polarizer or the analyzing polarizer at each polarization state angle.

In some embodiments, the tunable optical filter is configured to homogenously filter electromagnetic radiation incident on a plurality of pixels of the image sensor, or is configured to homogenously filter electromagnetic radiation incident on the full field of view of the image sensor.

According to yet another aspect of the present disclosure, the multispectral or hyperspectral imaging system further includes a processor configured to calculate a reflected spectra $R_{pixel}(\lambda_n)$ of the incident electromagnetic radiation from the object for each pixel of the image sensor and for a plurality of wavelengths $\lambda_n$ based on the following equation:

$$V_{pixel}(\varphi_m) = \sum_{n=1}^{N} \frac{S(\lambda_n) * I(\lambda_n) * T_{SRTF}(\lambda_n, \varphi_m)}{A(\lambda_n, \varphi_m)} * R_{pixel}(\lambda_n)$$

where $S(\lambda_n)$ is the sensitivity of the image sensor, $I(\lambda_n)$ is the object illuminant, $T_{SRTF}(\lambda_n, \varphi_m)$ is the transmission spectra of the phase retarder as a function of polarization state angle ($\varphi_m$ and $V_{pixel}(\varphi_m)$ is the pixel recorded intensity at each polarization state angle $\varphi_m$, where $A(\lambda_n, \varphi_m) = S(\lambda_n) * I(\lambda_n) * T_{SRTF}(\lambda_n, \varphi_m)$.

In one embodiment, the multispectral or hyperspectral imaging system further includes a memory configured to store values for (i) the sensitivity of the image sensor $S(\lambda_n)$, (ii) the object illuminant $I(\lambda_n)$, and (iii) the transmission spectra of the phase retarder also called subwavelength resonating tunable filter $T_{SRTF}(\lambda_n, \varphi_m)$ as a function of polarization state angle $\varphi_m$; and wherein the processor is further configured to calculate the equation $A(\lambda_n, \varphi_m) = S(\lambda_n) * I(\lambda_n) * T_{SRTF}(\lambda_n, \varphi_m)$ based on these stored values.

According to yet another aspect of the present disclosure, the processor is further configured to carry out the calculation of solving the equation $V_{pixel}(\varphi_m) = A(\lambda_n, \varphi_m) * R_{pixel}(\lambda_n)$ to determine the spectra $R_{pixel}(\lambda_n)$.

According to yet another aspect of the present disclosure, the processor is further configured to calculate a multispectral or hyperspectral image based on the determined spectra $R_{pixel}(\lambda_n)$.

According to yet another aspect of the present disclosure, the image sensor comprises a one-channel or black and white camera, a RGB camera or a multispectral camera.

According to yet another aspect of the present disclosure, the image sensor is configured to determine the polarization state angles for a plurality of wavelengths $\lambda_n$.

It is yet another aspect of the present disclosure to provide a spectrometer comprising:

the above-mentioned tunable optical filter; and a photodiode arranged downstream from the tunable optical filter and configured to record the electromagnetic radiation intensity of the electromagnetic radiation output from the analyzing polarizer or output polarizer at each polarization state angle.

According to another aspect of the present disclosure, the spectrometer further includes a plurality of photodiodes each associated with a broadband optical filter.

It is yet another aspect of the present disclosure to provide a multispectral or hyperspectral imaging method including the steps of:
- providing incident electromagnetic radiation from an object to an input polarizer configured to produce linearly polarized electromagnetic radiation;
- providing the linearly polarized electromagnetic radiation having first and second polarization components on two orthogonal axes to a phase retarder configured to carry out a wavelength dependent shift of a phase of the first and/or second polarization component, wherein the phase retarder is a phase retarder comprising at least a plurality of periodically substantially aligned subwavelength structures configured to generate localized surface plasmon resonances or subwavelength dielectric resonances at a first resonance frequency when the first or second polarization component is incident on the phase retarder;
- providing the electromagnetic radiation output from the phase retarder to an analyzing polarizer configured to filter said provided electromagnetic radiation at a plurality of different polarization state angles $\varphi_m$ to output electromagnetic radiation having distinct spectral content at each polarization state angle $\varphi_m$; and
- recording, using an image sensor including a plurality of pixels, an electromagnetic radiation intensity $V_{pixel}$ ($\varphi_m$) of the electromagnetic radiation output from the analyzing polarizer at a plurality of different polarization state angles.

It is yet another aspect of the present disclosure to provide a multispectral or hyperspectral imaging method including the steps of:
- providing incident electromagnetic radiation from an object to an analyzing polarizer configured to filter said provided electromagnetic radiation at a plurality of different polarization state angles $\varphi_m$ to output electromagnetic radiation at each polarization state angle $\varphi_m$;
- providing the output electromagnetic radiation having first and second polarization components on two orthogonal axes to a phase retarder configured to carry out a wavelength dependent shift of a phase of the first and/or second polarization component, wherein the phase retarder is a phase retarder comprising at least a plurality of periodically substantially aligned subwavelength structures configured to generate localized surface plasmon resonances or subwavelength dielectric resonances at a first resonance frequency when the first or second polarization component is incident on the phase retarder;
- providing the electromagnetic radiation output from the phase retarder to an output polarizer configured to produce linearly polarized electromagnetic radiation; and
- recording, using an image sensor including a plurality of pixels, an electromagnetic radiation intensity $V_{pixel}$ ($\varphi_m$) of the electromagnetic radiation output from the output polarizer at a plurality of different polarization state angles $\varphi_m$.

According to still another aspect of the present disclosure, the method further includes the step of:
- calculating a reflected spectra $R_{pixel}(\lambda_n)$ of the incident electromagnetic radiation from the object for each pixel of the image sensor and for a plurality of wavelengths $\lambda_n$ based on the following equation:

$$V_{pixel}(\varphi_m) = \sum_{n=1}^{N} \underbrace{S(\lambda_n) * I(\lambda_n) * T_{SRTF}(\lambda_n, \varphi_m)}_{A(\lambda_n, \varphi_m)} * R_{pixel}(\lambda_n)$$

where $S(\lambda_n)$ is the sensitivity of the image sensor, $I(\lambda_n)$ is the object illuminant, $T_{SRTF}(\lambda_n, \varphi_m)$ is the transmission spectra of the phase retarder as a function of polarization state angle $\varphi_m$ and $V_{pixel}(\varphi_m)$ is the pixel recorded intensity at each polarization state angle $\varphi_m$, where $A(\lambda_n, \varphi_m) = S(\lambda_n) * I(\lambda_n) * T_{SRTF}(\lambda_n, \varphi_m)$.

According to still another aspect of the present disclosure, the method further includes the steps of:
- storing values for (i) the sensitivity of the image sensor $S(\lambda_n)$, (ii) the object illuminant $I(\lambda_n)$, and (iii) the transmission spectra of the phase retarder $T_{SRTF}(\lambda_n, \varphi_m)$ as a function of polarization state angle $\varphi_m$; and
- calculating the equation $A(\lambda_n, \varphi_m) = S(\lambda_n) * I(\lambda_n) * T_{SRTF}(\lambda_n, \varphi_m)$ based on these stored values.

According to still another aspect of the present disclosure, the method further includes the step of:
- carrying out the calculation of solving the equation $V_{pixel}(\varphi_m) = A(\lambda_n, \varphi_m) * R_{pixel}(\lambda_n)$ to determine the spectra $R_{pixel}(\lambda_n)$.

According to still another aspect of the present disclosure, the method further includes the step of:
- calculating a multispectral or hyperspectral image based on the determined spectra $R_{pixel}(\lambda_n)$.

According to still another aspect of the present disclosure, the subwavelength structures are elongated structures.

Advantageously, the tunable optical filter and imaging system of the present disclosure permits to maintain full spatial resolution, since the filter can be placed in front of an imaging system and thus allows full spatial resolution recording. The tunable optical filter and imaging system of the present disclosure does not bleach, is expected to be stable at high temperature, can be fabricated cost-efficiently and shows angle-stable transmission.

The tunable optical filter and imaging system can be tuned by simply changing the polarization (mechanically or electrically). This enables compact and lightweight applications, essential for miniaturization e.g. lab-on-chip applications or high-demanding applications, e.g. space. Furthermore, the geometry of tunable optical filter and the imaging system can be designed to act angle-insensitive and with a broadband transmission, maintaining a high field-of-view and high overall photon efficiency, respectively.

Additionally, the number of filters is not fixed by the system itself but defined by the different polarization angles. This very large number of filters is useful because: a) spectral reconstruction can be done directly and without an estimation algorithm e.g. Wiener filtering requiring prior knowledge, b) depending on the measured reflection, the system is solved by different filters, enabling detection of e.g. spectral singularities, and c) they reduce random noise, leading to a more stable solution during reconstruction. Consequently, compared to other systems, the imaging system of the present disclosure can estimate the spectral reflectance of any object or objects (colored patches and spectral singularities) directly without prior knowledge. This and the high-signal-to-noise enables detection of laser lines which are separated by 1 nm. The number of filters affecting the recording time, can be adapted depending on application.

The tunable optical filter can not only be used with a simple one channel imaging system, but due to the high field-of-view it can easily be adapted before any existing one- or multichannel imaging system containing complex optics. More specifically, the proposed tunable optical filter can work, for example, in conjunction with a RGB camera, strongly increasing spectral recording capabilities by multiplication of each channel by the number of plasmonic or dielectric filters. This enables cost efficient and adaptable applications for end-users.

Furthermore, the tunable optical filter and imaging system of the present disclosure can operate in different spectral ranges depending on application requirements.

The working principle of the tunable optical filter is similar to the one based on variable filters, however, the filter property can advantageously be tuned by active change of the polarization and not the structure itself (e.g. the variable filters of FIG. 1A). This enables a much more compact system while allowing cost efficient fabrication. Furthermore, the tunable optical filter is largely angle-stable in all directions, enabling a high FOV. The required thickness of the polarization-sensitive and protected structure of the filter is in the range of micrometers, making it highly attractive for integration into an existing system, for daily-use or for applications were miniaturized, lightweight and robust systems are required. While other tunable filters based on plasmonics exist, they however suffer from high angle-dependency, lack of active tuning capability or structural complexity. Compared to snapshot systems, the tunable optical filter of the present disclosure has the advantage of maintaining the full spatial resolution, to be cost-efficient and integrate-able into existing platforms (e.g. RGB camera). Furthermore, the number of used filters (defining the spectral resolution) can be adapted dynamically to the particular application, defining an optimum between spectral and temporal resolution. The imaging system of the present disclosure is capable of estimating a spectral reflectance of colored objects at full spatial resolution and in the same manner resolving spectral singularities (e.g. laser lines) with high spectral accuracy. Compared to spectral estimation using RGB cameras, no prior knowledge of the shape or analysis of test targets is required.

The above and other objects, features and advantages of the present invention and the manner of realizing them will become more apparent, and the invention itself will best be understood from a study of the following description with reference to the attached drawings showing some preferred embodiments of the invention.

A BRIEF DESCRIPTION OF THE SEVERAL VIEWS OF THE DRAWINGS

FIG. 1A shows a known method of scanning spectrally while acquiring images used in multi- and hyperspectral imaging systems.

FIG. 1B shows another known method of scanning spatially (line- or point-wise) while obtaining spectra used in multi- and hyperspectral imaging systems.

FIG. 1C shows a further known method of obtaining an image with spectral information in snapshot mode using one sensor.

Figure 8A:
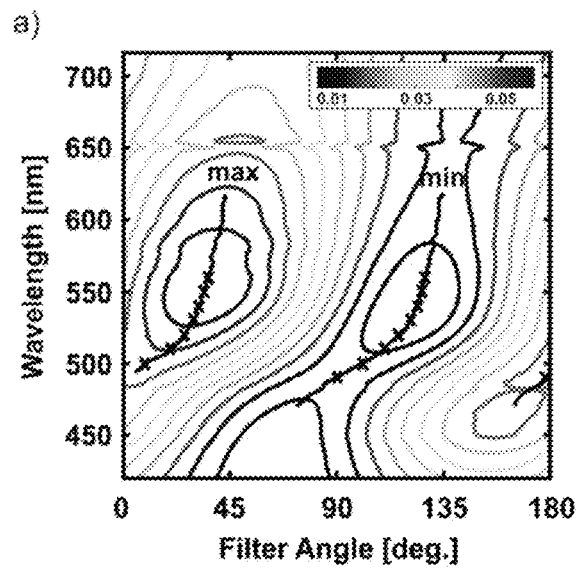
FIG. 8A shows a contour plot of 180 filters (multiplied with the camera sensitivity) with a black line indicating the local minimum and maximum. The crosses indicate the spectral position of laser peaks, which are measured and reconstructed as shown in FIG. 8B.
Figure 8B:
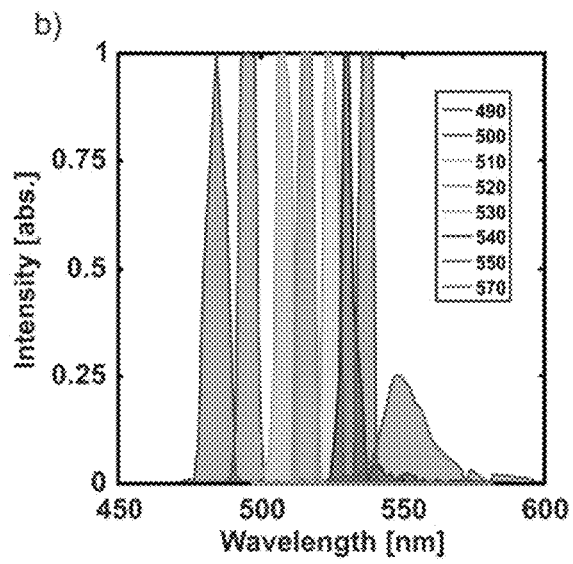

FIG. 8B thus shows the spectral position of laser peaks.

Figure 8C:
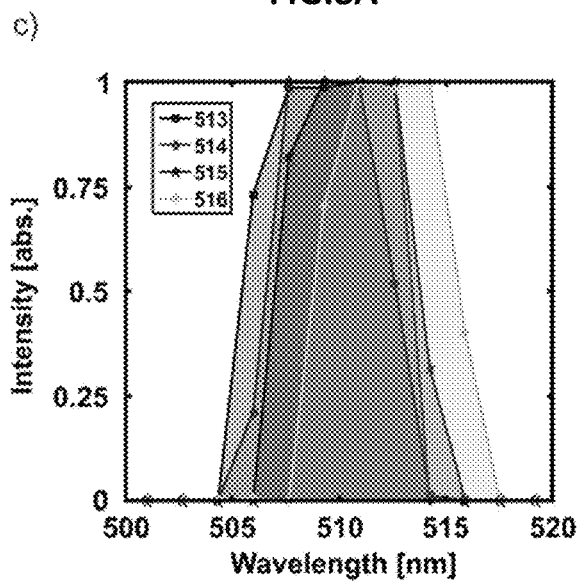

FIG. 8C plots the spectral resolution limit shown by distinguishing laser peaks of 513, 514, 515 and 516 nm.

Figure 8D:
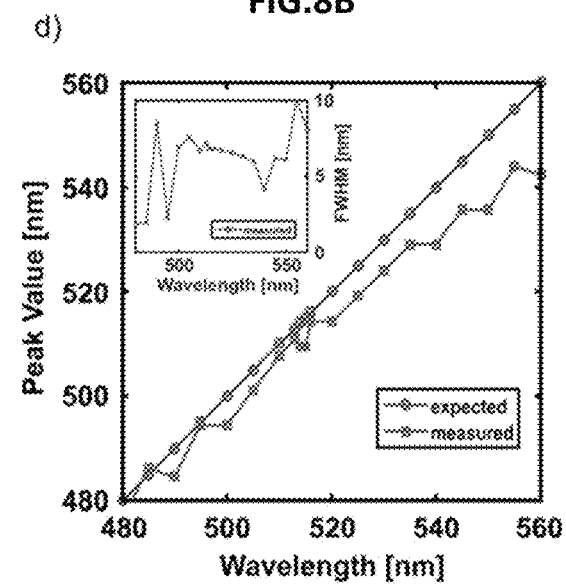

FIG. 8D plots a comparison of expected and reconstructed peak position of the laser (inset: corresponding FWHM).

Figure 9A:
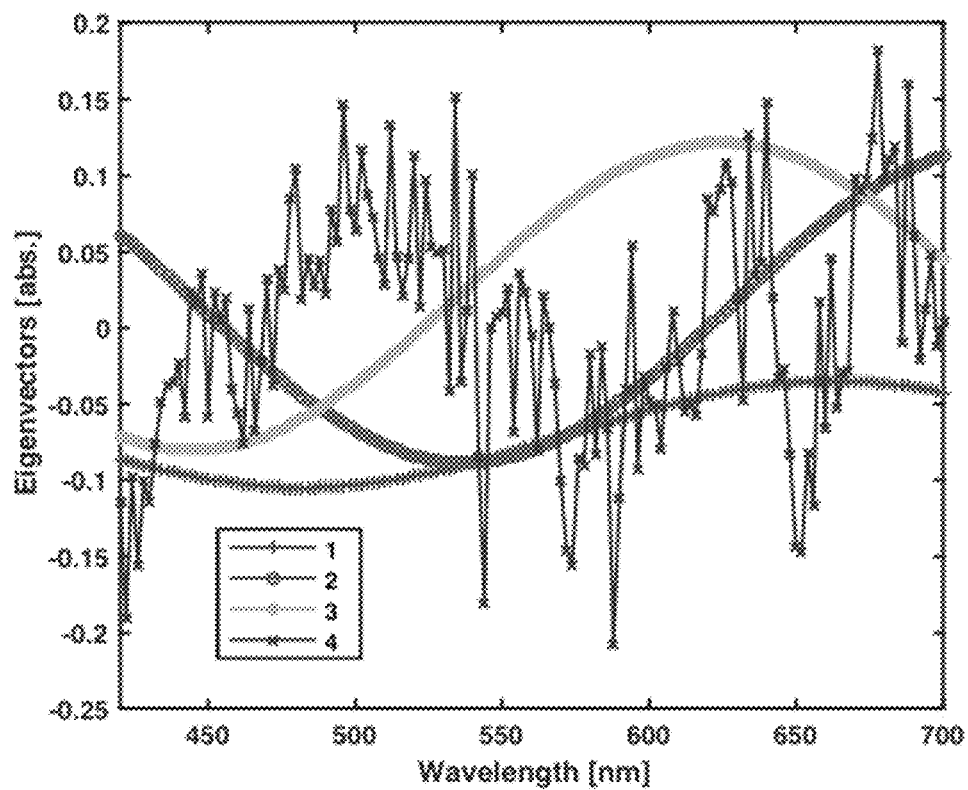
Figure 9B:
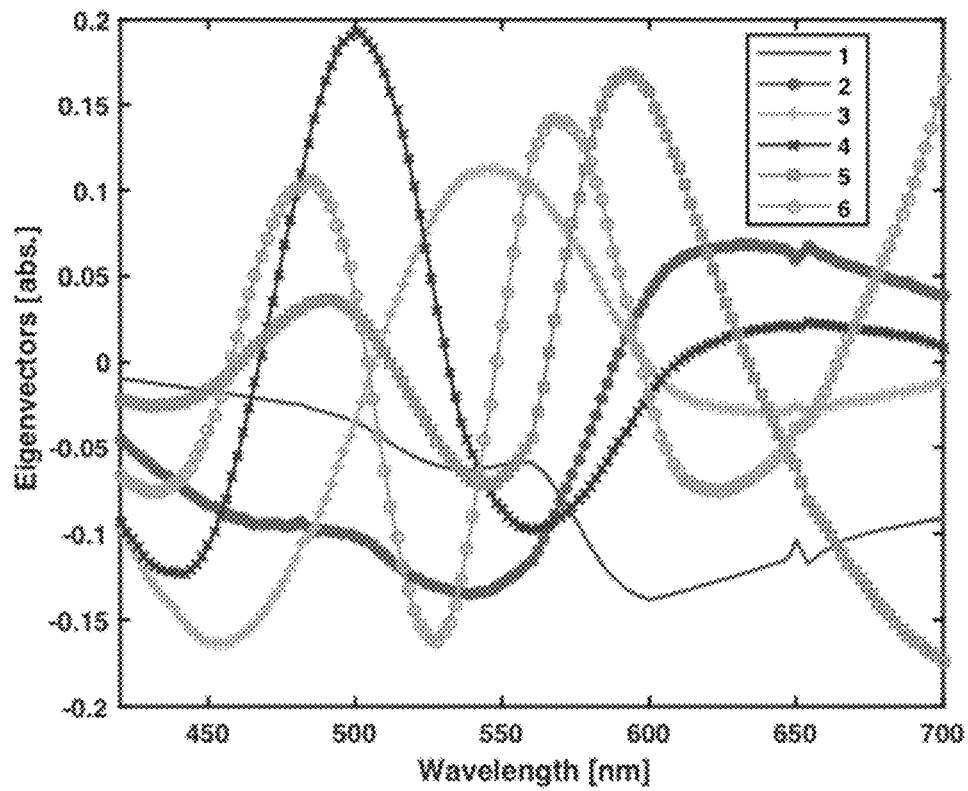

FIGS. 9A and 9B show a comparison of the Eigenvectors of using the filter and a B/W camera and a RGB camera.

Figures 10, 11:
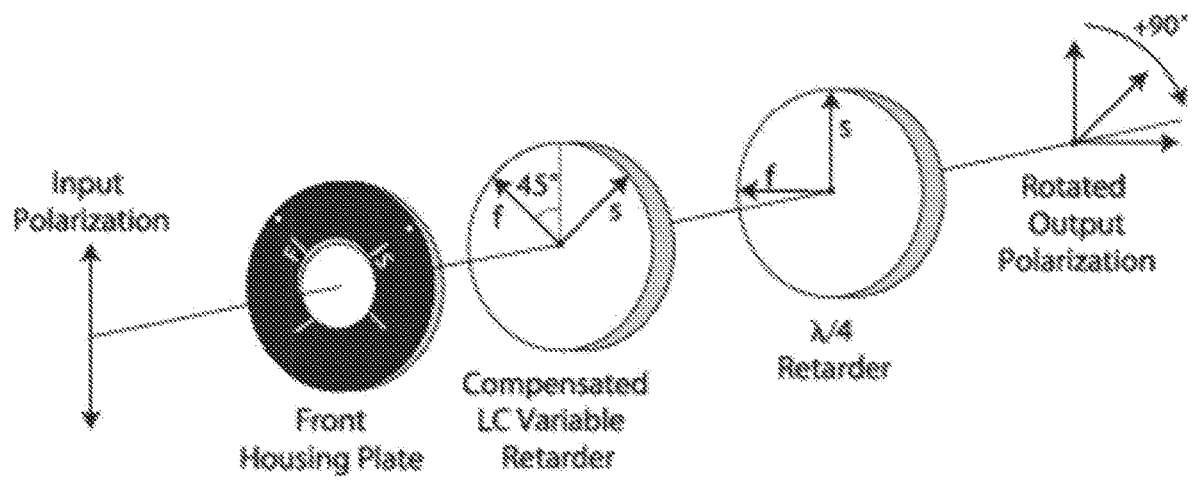

FIG. 10 is a table containing the eigenvalues corresponding to the eigenvectors of FIGS. 9A and 9B.

FIG. 11 shows the operation of a liquid crystal Polarization Rotator showing complete rotation of a linearly polarized input beam.

Figure 12:
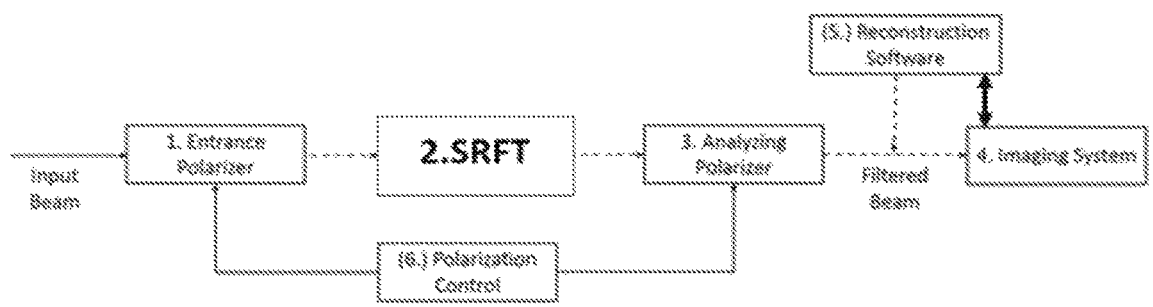

FIG. 12 shows a representation of an example of a possible implementation of the system of the present disclosure including an entrance polarizer, a filer, an analyzing tunable polarizer, an imaging device for measuring pixel-wise intensity at each filter, reconstruction software for calculating spectra from a set of filter-dependent intensities, and control software for controlling the polarizers and imagining device.

Figure 13A:
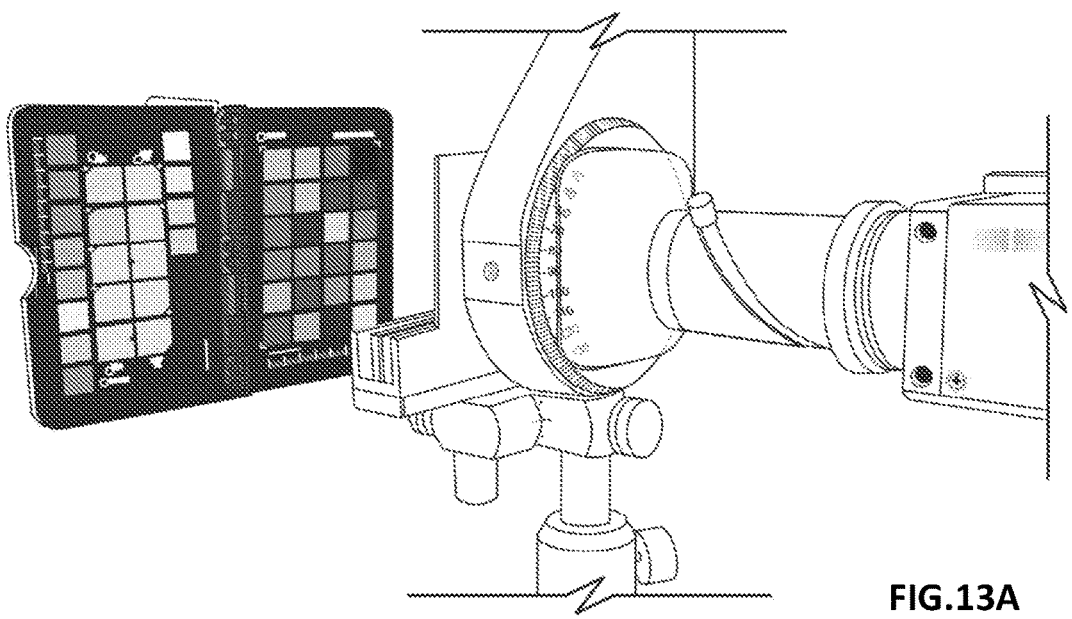

FIG. 13A is a photo of an exemplary imaging system of the present disclosure showing (from right to left) a B/W camera (Baumer, TX14), a lens system (Opto Engineering, MC3-03X), a tunable polarizer mounted on a rotation stage, the SRTF with a fixed polarizer and an object consisting of a color checker board.

Figure 13B:
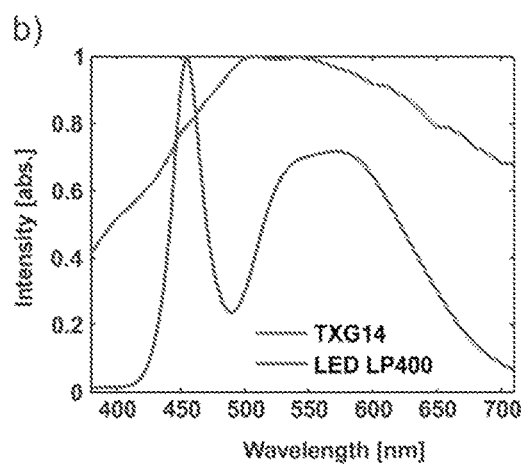

FIG. 13B shows spectra of an LED LP400 light source and the sensitivity of the B/W camera.

Figure 13C:
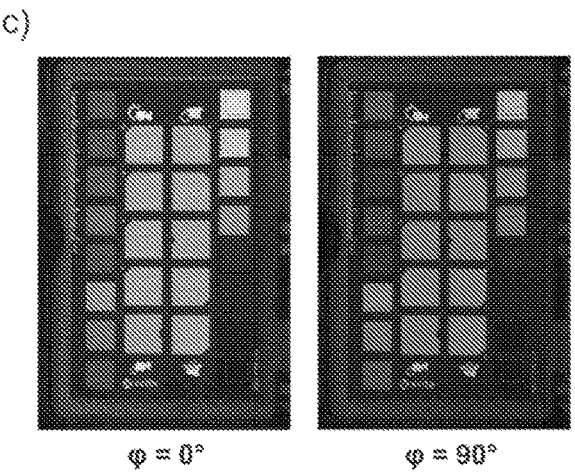

FIG. 13C shows intensity images of the color checker board of FIG. 13A at rotation angles of $0°$ and $90°$.

FIG. 14 shows a Table with CIE $\Delta E$ 2000 and RMS values of color patch measurements upon different tilt angles $0°$, $5°$ and $25°$ of the filter.

FIG. 15A is a color image recorded by a conventional RGB camera.

FIG. 15B is a color image produced by the imaging system of the present disclosure.

FIG. 15C shows the spectral information of some selected points where the different lines display neighboring pixels.

Herein, identical reference numerals are used, where possible, to designate identical elements that are common to the figures.

DETAILED DESCRIPTION OF THE SEVERAL EMBODIMENTS

Figure 2:
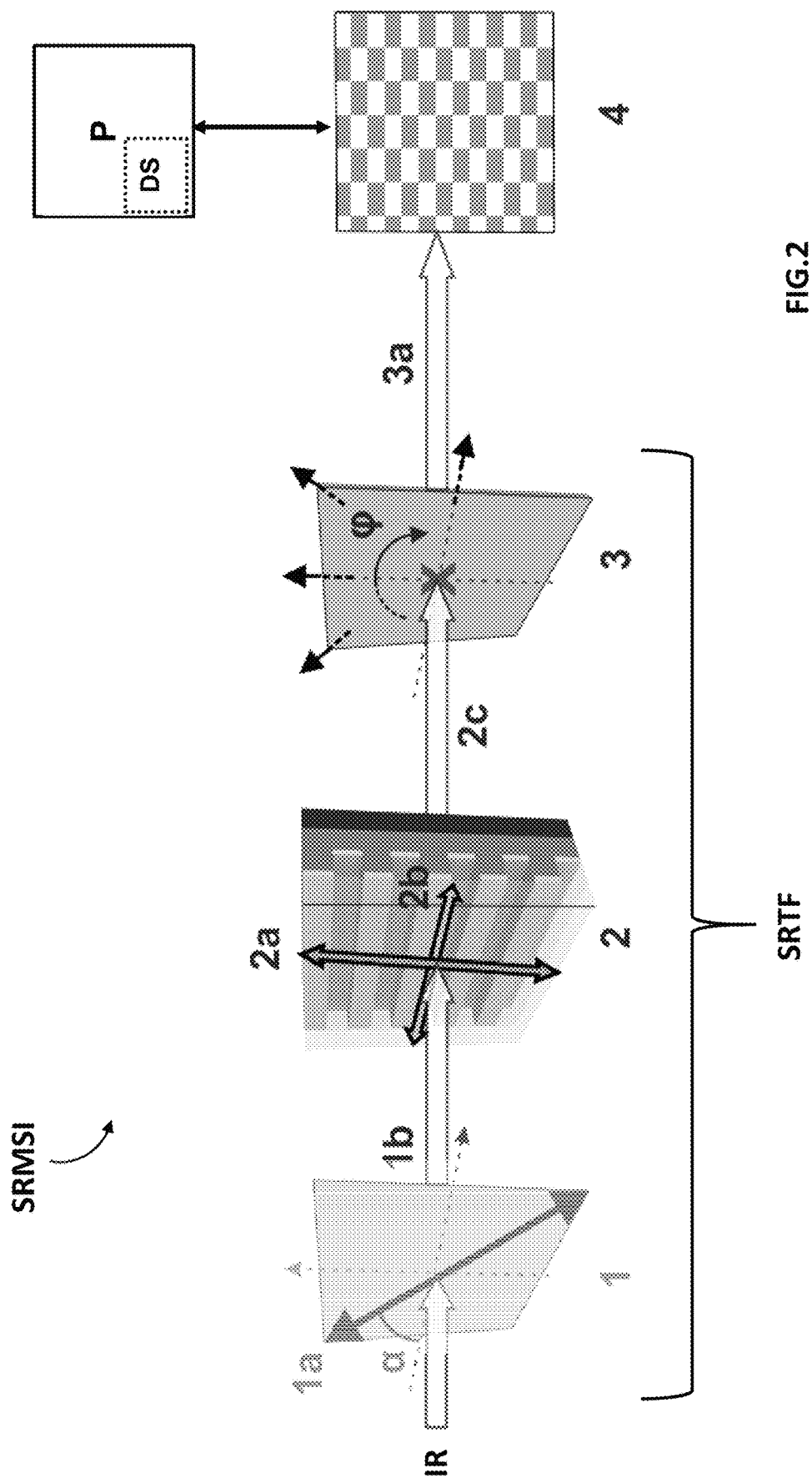
FIG. 2 shows an exemplary imaging system of the present disclosure including an entrance polarizer, an anisotropic/birefringent periodic subwavelength structure, an analyzing polarizer and an imaging device.
Figure 3A:
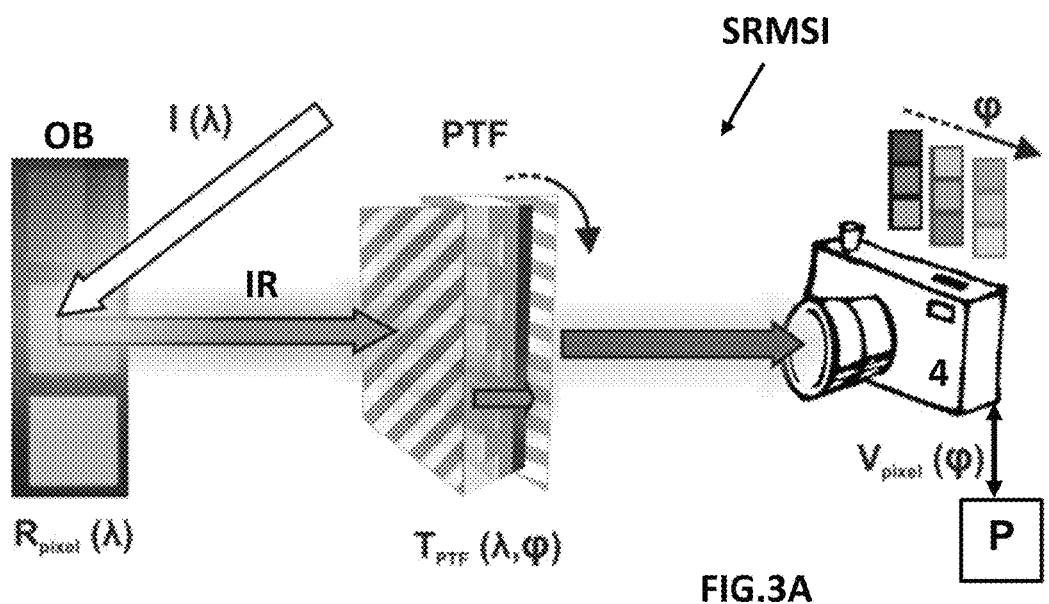
FIG. 3A shows an exemplary imaging system of the present disclosure.

FIGS. 2 and 3A show one aspect of the present disclosure, depicting a tunable optical filter SRTF and an imaging system SRMSI including the tunable optical filter SRTF.

The imaging system SRMSI can be, for example, a multispectral imaging or hyperspectral imaging system. The tunable optical filter SRTF can include an entrance or input polarizer 1, a phase retarder or a birefringent subwavelength resonating structure (BSRS) 2, and an analyzing polarizer 3. The imaging system SRMSI includes the tunable optical filter SRTF and an imaging sensor, imaging system or device, camera, or photodiode 4.

The input polarizer 1 is configured to receive incident electromagnetic radiation IR incident from an object OB, and is configured to produce, for example, linearly polarized electromagnetic radiation.

The phase retarder or birefringent subwavelength resonating structure (BSRS) 2 includes an anisotropic metallic or dielectric structure, for example, periodic and with spatial periodicity well below the wavelength or wavelength range of the incident light.

The phase retarder or BSRS 2 receives, for example, linearly polarized electromagnetic radiation having first and second polarization components on, for example, two orthogonal axes from the input polarizer 1. The phase retarder or BSRS 2 is configured to carry out a wavelength dependent shift of a phase of the first and/or second polarization components.

The phase retarder or BSRS 2 may comprise a plurality of periodically aligned subwavelength structures (for example, elongated structures) configured to generate localized surface plasmon resonances or subwavelength dielectric resonances at a first resonance frequency when the first or second polarization component is incident on the phase retarder or BSRS 2.

The analyzing polarizer 3 receives the electromagnetic radiation output from the phase retarder 2, and is configured to filter the received electromagnetic radiation at a plurality of different polarization state angles $\varphi_m$ (see for example FIG. 2) to output electromagnetic radiation having distinct spectral content at each polarization state angle $\varphi_m$. m represents the number of polarization state angles, FIG. 2 illustrates for example four polarization state angles. For example, the four polarization state angles could be chosen to be $\varphi_1=0°$, $\varphi_2=45°$, $\varphi_3=90°$ and $\varphi_4=135°$.

The analyzing polarizer 3 can however take a plurality of states, at least three, but can be in the range of ten to one hundred or hundreds. The plurality of states can be obtained either by mechanically rotating the polarizer 3 or using a voltage in the case of liquid crystals (see, for example, FIG. 11). The control of the orientation of the analyzing polarizer 3 generates, in combination with the elements 1 and 2, a plurality of transmission spectra, which are used as filters. This in-situ changing of transmissive states is referred to active tunability.

The imaging sensor 4 records an image for a plurality or each of the orientations of the analyzing polarizer 3. The entrance polarizer 1 and the phase retarder or BSRS 2 may not share a common symmetry axis when the entrance polarizer 1 is fixed compared to the BSRS 2, in order to generate a set of sharply modulated transmission states. The polarization transmitted through the entrance polarizer 1 can take two different states, either by mechanically rotating the polarizer or using a voltage in the case of liquid crystals. The control of the states of the entrance polarizer 1 provides information on the polarization of the incident light.

A broadband or narrowband light source (thermal or solid state) providing for example illumination $I(\lambda)$ can be used.

The BSRS 2 and the polarizers 1, 3 are in a preferable homogeneous, the BSRS or phase retarder 2 is designed to have substantially angle-independent transmission, so that it can be used for any numerical aperture of the imaging system. The imaging system 4 can therefore comprise or consist of, but is not limited to, an imaging sensor and an objective lens. However, other optical components may also be used.

The tunable optical filter SRTF or system SRMSI can be used in conjunction with other commercial multispectral imaging systems 4 such as e.g. RGB cameras to further enhance the spectral resolution. The tunable optical filter SRTF and the imaging system SRMSI can be adapted to different spectral ranges, depending on the application.

The phase retarder or birefringent subwavelength resonating structure 2 supports localized resonances. At the resonance frequency, light is absorbed or reflected, the remaining light being transmitted through the structure 2. The excitation efficiency of plasmons or dielectric resonance modes depends on the polarization of the incident light. Combined excitation of two different polarizations (see for example 2a and 2b in FIG. 2) can lead to a complex transmission pattern, including two distinct transmission spectra and the phase difference between, 2c in FIG. 2. This leads to wavelength-dependent distribution of light intensities into two novel polarization axis, which are defined by the phase shift.

The analyzing polarizer 3 filters out such a wavelength-dependent intensity distribution, by analyzing the output 2c at a certain polarization $\varphi_m$. This leads to the plurality of states (at least 3, but usually in the range of 10 to one hundred or hundreds), where 3a in FIG. 2 represents one of these states. The entrance polarizer 1 ensures, or enables, excitation of different polarization states (1a at angle α in FIG. 2) of the phase retarder or BSRS 2. As illustrated in FIG. 2, after passing through elements 1, 2, and 3, the intensity of the light is measured by the imaging system or device 4.

Alternatively, in another non-illustrated embodiment, the analyzing polarizer 3 and the input polarizer 1 can be inverted in position. The analyzing polarizer 3 receives electromagnetic radiation incident from an object OB, and is configured to filter the incident electromagnetic radiation at a plurality of different polarization state angles $\varphi_m$ and to output electromagnetic radiation at each polarization state angle $\varphi_m$. The phase retarder or BSRS 2 receives for example, from the analyzing polarizer 3, linearly polarized electromagnetic radiation having first and second polarization components on, for example, two orthogonal axis. The output polarizer (polarizer 1) receives the electromagnetic radiation output from the phase retarder 2, and filters the received electromagnetic radiation to output linearly polarized electromagnetic radiation.

The phase retarder or birefringent subwavelength resonating structure 2 comprises a plasmonic or dielectric resonating subwavelength structure providing a plasmonic or dielectric resonating filter having a phase shift at resonance (strongly increasing contrast) over different axis, making it birefringent with a strongly wavelength dependent birefringence, providing angle-independent properties (high field-of-view), and broadband transmission (high photon efficiency). The phase retarder or birefringent subwavelength resonating structure 2 can, for example, have the following features or properties:

Effect: phase shift, zero order transmission, broadband, chiral

Phase Shift: 1 or 2 phase shifts for each 1 or 2 polarizations

Broadband: absorbing or reflecting light at resonance

Structure: 1D or 2D

Figure 4A:
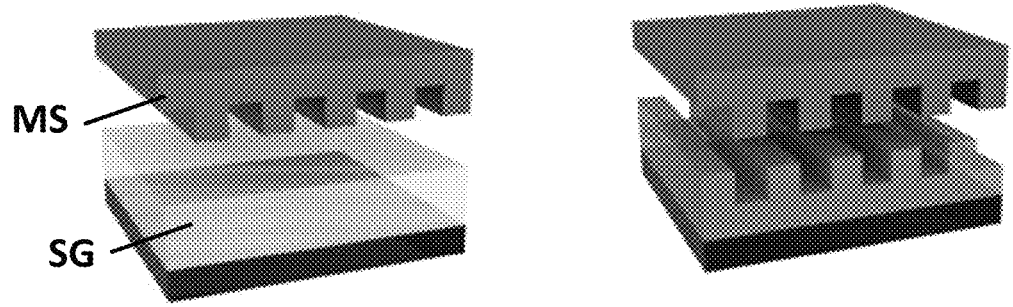
FIG. 4A shows an exemplary method for fabricating an exemplary phase retarder or birefringent subwavelength resonating structure.
Figure 4A:
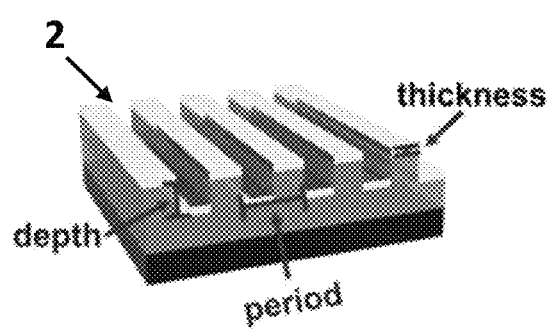
Figure 4A:
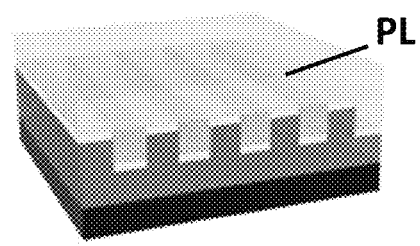

Exemplary Structure Type or form: stack of lines, lines, rods, ellipse, pillars, or any resonators procuring a phase shift Angle-independency (field-of-view): Exemplary period: 160 nm, 180 nm; Exemplary period range: 140-200 nm, or 160 to 180 nm Exemplary Depth: 70 nm, 90 nm; Exemplary depth range 30-120 nm Exemplary Materials for structure(s): Ag, Al, Au, Ni for metals inducing phase shift in the visible range, however other metals can be used; dielectric materials, especially high refractive index dielectrics and semiconductors Exemplary Thickness of Metal for structure(s): range 10 to 30 nm or 40 nm; range 5-50 nm Acting Spectral Range: can be modified and determined by values of depth, period, the structure material used, thickness, the underlying and/or covering material for operation, for example, in the visible, Infrared, Mid-infrared, UV Exemplary Underlying (and Covering) Material: Transparent sol-gel, plastic, polymer, or other materials Covering (Embedding): with (better protection, ambient condition) or without Area: homogenous (covering several pixels of field-of-view), line-wise varying, pixel-wise varying, patches for different cameras Spectral Range: homogenous for filter or pixelization could be used to enhance spectral resolution or dynamic range FIG. 4A shows an exemplary method for fabricating an exemplary phase retarder or birefringent subwavelength resonating structure 2. This exemplary phase retarder or birefringent subwavelength resonating structure 2 comprises, for example, periodic nanostructures (e.g. silver nanowires). It is fabricated by replication of a master structure MS (nanostructures with, for example, a 160 nm period, duty cycle 0.5, and 70 nm depth) in sol-gel SG, followed by evaporation of a thin layer of a metal (for example, 30 nm of silver) to form the nanowires or nanowire structures required for filtering. Subsequently, embedding in a protective layer or layers PL (for example, a sol-gel) is carried out for protection against abrasion or oxidation. Further details of an exemplary phase retarder or birefringent subwavelength resonating structure 2 and an exemplary method for its fabrication, as well as a tunable optical filter SRTF can be found in the article by DUEMPELMANN, Luc, et al. Four-Fold Color Filter Based on Plasmonic Phase Retarder, ACS Photonics, 2015, 3. Jg., Nr. 2, S. 190-196, the entire contents thereof being herewith incorporated by reference.

The phase retarder or birefringent subwavelength resonating structure 2 can include subwavelength metallic nanostructures having a metallic thickness value in the range of 5 nm to 100 nm, preferably 10 nm to 50 nm. A separation trench separating the metallic nanostructures may have a depth in the range of 30 nm to 250 nm, preferably 30 nm to 120 nm. The subwavelength metallic nanostructures can have, for example, a periodic separation in the range of 140 nm to 200 nm to provide an angle independent response of phase retarder. It is noted that all range values mentioned throughout this application include the boundary values.

This plasmonic phase retarder 2 including the plurality of metal nanostructures (nanowires) produce localized surface plasmon resonances (LSPR) permitting broadband wavelength filtering. Parameters of the nanostructures, such as the period and depth, can be varied to optimize angle- and orientation-dependency of the generated color and to tune the localized surface plasmon resonance (LSPR) to a desired wavelength range. The thickness of the silver nanowires also influences the position of the LSPR. The above-mentioned plasmonic phase retarder comprising a periodic array of silver nanowires can be used to carry out color filtering in the visible spectral range.

The plasmonic phase retarder 2 supporting localized surface plasmon resonances alters the polarization of incident light and induces a strong phase shift for a polarization setting. As a result, the rotation of the analyzing polarizer 3 gives rise to distinct colors.

Figure 3B:
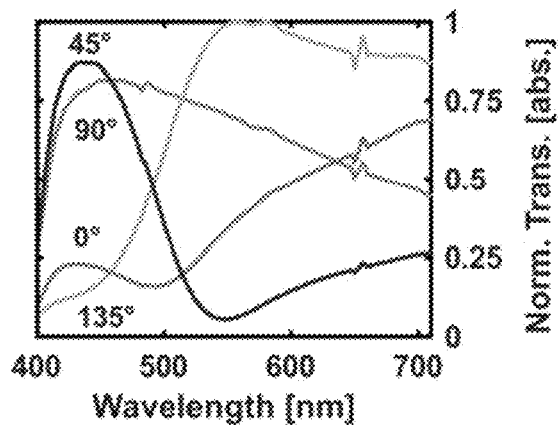
FIG. 3B shows how a wavelength-dependent phase shift gives rise to distinct spectra for angles $\varphi=0°$, $45°$, $90°$, and $135°$ and shows four of the possible transmission spectra at $\varphi$.
Figure 4B:
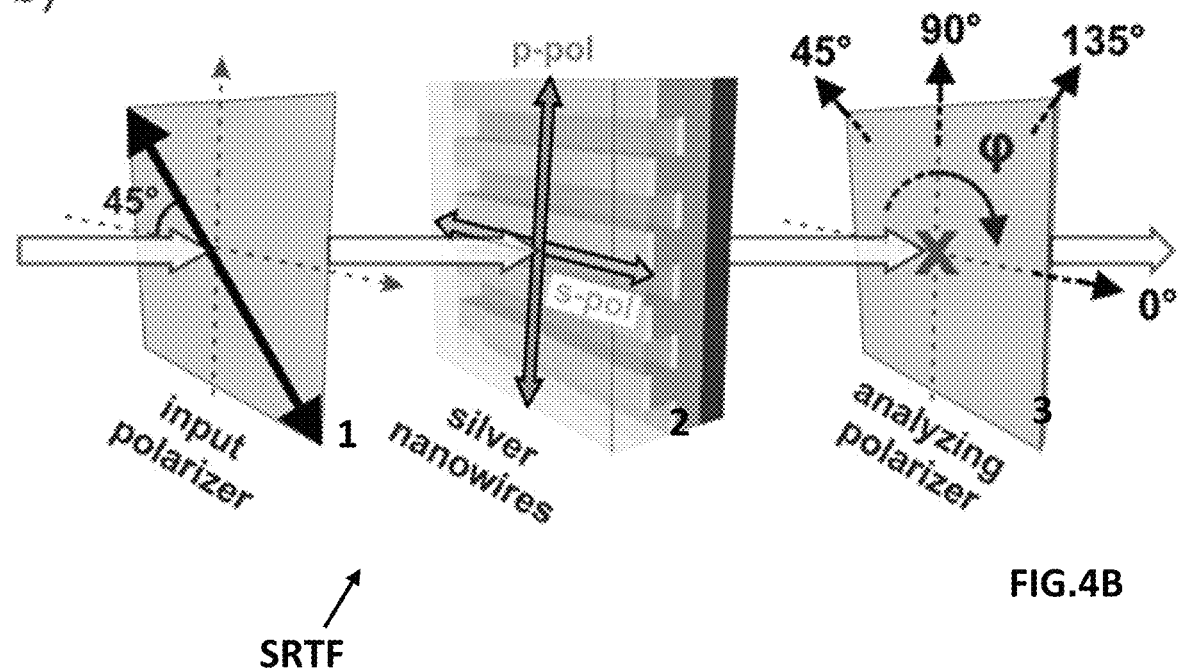
FIG. 4B shows an exemplary generation of distinct colors produced by setting the input polarizer at angle $\alpha=45°$ (diagonally polarized) and the analyzing polarizer to an angle $\varphi=0°$, $45°$, $90°$, and $135°$.

For example, to generate distinct colors, the input polarizer 1 can be set for example at angle α=45° (diagonally polarized) and the analyzing polarizer 3 angle set at φ=0°, 45°, 90°, and 135° as illustrated in FIG. 4B. The resulting transmission spectra are shown in FIG. 3B. Wavelength-dependent birefringence of the phase retarder 2 leads to a rotation of the incident polarization such that the transmission through the analyzing polarizer 3 is enhanced or weakened as a function of the wavelength, depending on the polarization angle. A strong spectral change occurs near the plasmon resonance and is considered to be the main reason for the wavelength-dependent rotation of the phase (a wavelength-dependent phase shift). As illustrated in FIG. 3B, the wavelength-dependent phase shift gives rise to distinct spectra for each angle φ=0°, 45°, 90°, and 135°. Different colors are obtained for different settings φ of the analyzing polarizer and the wavelength-dependent phase shift is responsible for the observation of distinct output colors.

This above described exemplary plasmonic phase retarder 2 includes a plurality of periodically substantially aligned subwavelength metal elongated structures configured to generate localized surface plasmon resonances (at a first resonance frequency and/or at a second resonance frequency) to produce the above-mentioned wavelength-dependent phase shift. Alternatively, the phase retarder 2 may be configured to generate subwavelength dielectric resonances at a first resonance frequency and/or at a second resonance frequency to produce the above-mentioned wavelength-dependent phase shift.

Subwavelength dielectric resonances are resonances occurring in a subwavelength dielectric structure, for example, a geometrically defined dielectric structure, that can be repetitive and plural, having an abrupt change in permittivity. This creates in the electromagnetic field, reflected at dielectric/dielectric interface(s) (and possibly partially trapped in high refractive index subwavelength volumes—such as in subwavelength gratings—acting as local resonator), constructive or destructive interferences.

The dielectric structure preferably comprises or consists of a high refractive index dielectric material or layer located, for example directly, on a low refractive index dielectric material or layer. Many of these materials, such as titanium dioxide/titania can also be called semiconductors or high refractive index semiconductors, depending on the wavelength range considered, because of their existing bandgap. Subwavelength dielectric resonances therefore also can include resonances due to a subwavelength semiconductor structure, substantially transparent in a part of the wavelength range of interest. Such high refractive index material have preferably a refractive index in the wavelength range of interest higher than 1.8, preferably higher than 2. As examples, TiO2, ZnS, Ta2O5, HfO2, ZrO2, AlN and Al2O3 can be used. For a wavelength range in the infrared, other materials transparent in this wavelength range are suitable such as silicon, chalcogenide glasses or gallium compounds. The refractive index of the material surrounding the high refractive index material in this embodiment in preferably lower than 1.6. It can as example be air on one side of the subwavelength grating, with a refractive index of 1, and around 1.55 on its other side, with a glass or polymer supporting structure.

The phase retarder 2 configured to generate subwavelength dielectric resonances can have, for example, a structure similar to that of the plasmonic phase retarder 2 shown in FIG. 4A, where the metal subwavelength structures are replaced by a high refractive index dielectric material located on an underlaying material of lower refractive index.

As previously mentioned, the phase retarder 2 can comprise a plurality of periodically substantially aligned subwavelength elongated structures configured to generate localized surface plasmon resonances or subwavelength dielectric resonances at a first resonance frequency and/or at a second resonance frequency. The phase retarder can alternatively comprise a first plurality (or first set) of subwavelength structures, for example, periodically substantially aligned subwavelength elongated structures configured to generate localized surface plasmon resonances or subwavelength dielectric resonances at first and second resonance frequencies, and further include a second plurality (or second set) of subwavelength structures, for example periodically substantially aligned subwavelength structures, configured to generate localized surface plasmon resonances or subwavelength dielectric resonances at third and fourth resonance frequencies. The first to fourth frequencies are different frequency values. The first plurality of subwavelength structures and the second plurality of subwavelength structures are configured, (for example, via their structural form, thickness, periodicity materials etc. as previously mentioned) to produce resonances at these different frequencies.

The first and second set of subwavelength structures, for example, periodically aligned subwavelength metallic nanostructures comprising subwavelength metallic nanostructures can have a different orientation, and/or a different (metallic) thickness value, and/or a different periodic separation, and/or a different separation trench depth.

The resonance (localized surface plasmon resonance or subwavelength dielectric resonance) can also consist of a plurality of resonances, in spectral proximity, or within a coupling regime, forming a coupled resonance system. This coupled resonance system acts as one resonance.

The phase retarder 2 generally is located between the input polarizer 1 and the tunable or analyzing polarizer 3. The input polarizer 1 can be a conventional polarizer for producing, for example, linearly polarized electromagnetic radiation. In other words, an optical filter letting electromagnetic waves of a specific polarization pass and blocks electromagnetic waves of other polarizations. Light of undefined or mixed polarization s filtered to provide light of well-defined polarization or polarized light. The input polarizer 1 can be a built-in polarizer integral (forming one object) with the phase retarder 2. It can be tunable as well to further enhance detection capability. Direct excitation of two states by other filtering methods or adapted plasmonic structures 2 can also be envisaged. The analyzing polarizer 3 can also be a conventional polarizer.

The polarizers 1, 3 can include liquid crystals and a liquid crystal polarization rotator to allow electrical tuning of the polarization. Alternatively, mechanically tunable polarizers can be used. The SRTF can be rotated in respect to the imaging axis, e.g. for polarization sensing.

Stacking of the elements 1, 2 and 3 can be carried out with, for example, adhesive (e.g. glue), lamination, hot bonding, direct integration, spin coat of liquid crystal, etc. For example, after fabrication of the phase retarder 2, a wire grid polarizer 1 (for example, ITOS, XP44) can be glued diagonally to the nanowires lines of the phase retarder 2. This can then be fixed onto a holder just in front of an automatic rotation stage (for example, Thorlabs, PRM1/MZ8) containing a wire grid polarizer 3 (for example, ITOS, XP44). Rotation of this polarizer 3 enables different transmission spectra to be obtained from this plasmonic active tunable filter SRTF.

The incident polarizer 1 can be tunable to either analyze the polarization of the incoming light or can be used as the analyzing polarizer, where in this case the second polarizer is preferably static. As an example, the incident polarizer 1 can analyze the orientation of linear polarized incoming light. Combined with a retarder plate, circular and ellipsoidal polarization chirality can be analyzed.

The imaging system SRMSI (see for example FIGS. 2 and 3A) can include optionally optical components such as lenses and optional light sources (with known or unknown spectra). As previously mentioned, the imaging system SRMSI may include an image sensor 4 which can be an imaging system or device, camera, or photodiode. This may be a B/W, RGB, or other broadband multispectral camera (or cameras). The sensor 4 can be, for example, a CCD or CMOS device comprising a plurality of pixels each configured to individually capture incoming light, or can be for example an active pixel sensor (APS) containing an array of pixel sensors each comprising for example a photodetector and amplifier.

The image sensor 4 includes at least one or a plurality of pixels. The image sensor 4 is arranged downstream from the tunable optical filter SRTF and is configured to record the electromagnetic radiation intensity of the electromagnetic radiation output from the output polarizer or the analyzing polarizer 3 at each polarization state angle. The tunable optical filter SRTF can be configured to homogenously filter electromagnetic radiation incident on a plurality of pixels of the image sensor 4, or to homogenously filter electromagnetic radiation incident on the full field of view of the image sensor 4.

The imaging system SRMSI can include optical components such as lens, objective lens, or microlens. Such components may be positioned between the tunable filter SRTF and the image sensor 4. The imaging system SRMSI can include a light source such as a LED, xenon lamp, tunable light source, or use sunlight as a light source. The tunable optical filter SRTF can be located in the imaging system in different positions, it can be flexible in front of the image sensor 4, closely attached, or attached onto the imaging chip 4. The imaging system SRMSI can be miniaturized, lightweight, electrically addressable, adaptable, and exchangeable. Spectral recording can be carried out using the full spatial resolution of the camera 4 since the filter SRTF is located before the imaging sensor 4.

FIG. 3A shows an exemplary implementation of the SRMSI. Light I(λ) illuminates an object OB and is reflected as spectrum ($R_{pixel}(\lambda_n)$) which enters the SRTF as incident light IR. Alternatively, a spectrum ($R_{pixel}(\lambda_n)$) is directly emitted by a source. The spectrum ($R_{pixel}(\lambda_n)$) passes the subwavelength resonating tunable filter SRTF set at different polarizations $\varphi_m$ of the analyzing polarizer 3, (where m is the number of filters, that is, the number of angles φ used, the entrance polarizer 1 provides for example linearly polarized electromagnetic radiation to the phase retarder 2 of the SRTF), and is recorded as intensities $V_{pixel}(\varphi_m)$ by the imaging system or sensor 4 comprises a plurality of pixels. A selection of different filter SRTF transmission spectra 3a (FIG. 2) is given in FIG. 3B for different polarizations φ. The filter dependent intensity $V_{pixel}(\varphi_m)$ of measured color patches is given as an example in FIG. 3C.

To calculate the reflected spectra ($R_{pixel}(\lambda_n)$) from the object OB, the continuous spectral range is divided into N discrete parts. The recorded intensity of each pixel ($V_{pixel}(\varphi_m)$) can be defined as a discrete function of the wavelength $\lambda_n$ as:

$$V_{pixel}(\varphi_m) = \sum_{n=1}^{N} \underbrace{S(\lambda_n) * I(\lambda_n) * T_{SRTF}(\lambda_n, \varphi_m)}_{A(\lambda_n, \varphi_m)} * R_{pixel}(\lambda_n) \quad \text{Equation 1}$$

with the sensitivity of the camera 4 being $S(\lambda_n)$, the illuminant being $I(\lambda_n)$, the transmission spectra of the filter SRTF being $T_{SRTF}$ and the reflection of the target or object OB being $R_{pixel}(\lambda_n)$. It is noted that * with represents multiplication. $V_{pixel}(\varphi_m)$ and $R_{pixel}(\lambda_n)$ include spatial position, and are evaluated for each pixel of the imaging sensor or system 4.

S, I and $T_{SRTF}$ only depend on the wavelength $\lambda_n$ and polarization angle of the filter $\varphi_m$ respectively and need to be evaluated only once, thus ($A(\lambda_n, \varphi_m)$) can be evaluated only once where $A(\lambda_n, \varphi_m)=S(\lambda_n)*I(\lambda_n)*T_{SRTF}(\lambda_n, \varphi_m)$.

By solving the equation Vpixel($\varphi_m$)=A($\lambda_n, \varphi_m$)*Rpixel($\lambda_n$), the spectra $R_{pixel}(\lambda_n)$ can be determined. Generally, the number of used filters $\varphi_m$=n. For n>m estimation methods (e.g. Wiener estimation) can be utilized, for n<m, the solution should be addressable or reduction methods (e.g. principal component analysis PCA) can be used.

Figure 3C:
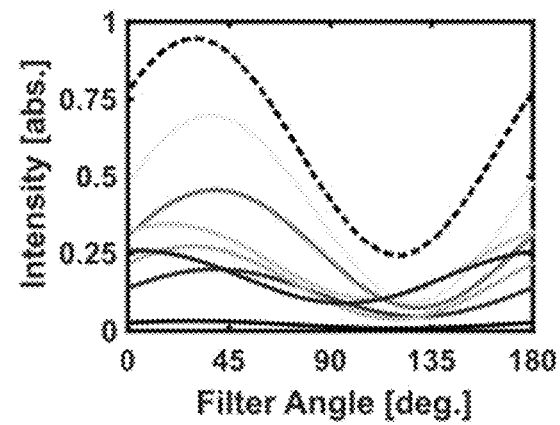
FIG. 3C shows exemplary filter dependent intensity of measured color patches recorded using an imaging device or sensor.

In other words, a source with spectrum I(λ) illuminates the sample or object OB to be measured. The reflected light, with intensity $R_{pixel}(\lambda_n)$, transmits trough the filter SRTF with transmission $T_{SRTF}$ (which depends on the rotation angle φ of the polarizer), before an intensity image, $V_{pixel}(\varphi_m)$, is recorded by a camera 4 with for example a plurality of pixels and a given sensitivity S(λ). FIG. 13B shows exemplary sensitivity values of a B/W camera 4. An exemplary spectrum I(λ) of a LED LP400 light source is also shown. The intensity of the image is extracted for each pixel and used to reconstruct the spectral information of the observed object OB. FIG. 3C shows the intensity of different colored patches (white is dashed) of a ColorChecker ($V_{pixel}$) at different filter angles $\varphi_m$.

A black and white camera 4 can, for example, be used, but the following also applies for the usage of multispectral cameras, where multiple spectral sensitivities S are used. The reflected spectra $R_{pixel}(\lambda_n)$ is calculated by reconstruction. The recorded intensity of each pixel $V_{pixel}$ can be determined as a discrete function of the wavelength (Equation 1 above). $V_{pixel}$ and $R_{pixel}$ depend on each recorded pixel and have to be 'evaluated individually' for each sample or object. S, I and $T_{SRTF}$ only depend on the wavelength and the rotation angle of the filter $\varphi_m$ respectively and are evaluated only once for a given illuminant. FIG. 13B shows exemplary values for S and I. $T_{SRTF}$ is determined, for example, by measuring, at the different angles φ, the transmission spectrum of a light source or illuminant with a known spectrum and intensity when passed directly through the filter SRTF. The SRTF can be characterized for example by direct illumination of collimated light source and a spectrometer (for example, Photoresearch, SpectraScan 735). A transmission spectra can be for example recorded each 1° and calibrated by the measured light source.

The number of discretization parts N defines the number of unknowns to determine the reflected spectrum $R_{pixel}(\lambda_n)$. The number of filters M, expressed by the rotation angle $\varphi_m$, determines the number of known variables. This leads to a linear equation system in matrix form of Vpixel($\varphi_m$)=A($\lambda_n, \varphi_m$)*Rpixel($\lambda_n$), with M knowns and N unknowns.

Solving this linear equation gives the spectra $R_{pixel}$ of a given pixel discretized by $\lambda_n$. To directly relate the measured intensity to spectral information a linear least-squares approximation can, for example, be used (more details can be found for example in Strang, G. Introduction to linear algebra. Wellesley-Cambridge Press (2016), the entire contents thereof being herewith incorporated by reference). The spectra R($\lambda_n$) can be determined by minimizing the squared Euclidean norm of:

Equation 2

$$\min_{R} \frac{1}{2} \|A(\lambda_n, \varphi_m) * R_{pixel}(\lambda_n) - V_{pixel}(\varphi_m)\|_2^2 \quad (2)$$

However, other reconstruction algorithms can also be used, such as for example, principle component analysis (PCA) or Wiener estimation. Solving of the algorithm can be done in different ways, and can be optimized depending on the application, the number of filters used and a referenced database.

- Solving algorithm: Least-squares (generalized, regularized, weighted), L1-Norm, QR decomposition
- Reduction methods: PCA, SVD
- Estimation algorithm: Eigenvector, Wiener filtering, orthogonal projection
- Possible improvement using: dark current, cf. known database, error matrix, calibration matrix, etc.
- Required parameters: Spectra of filter, sensitivity of each channel, ev. light source
- Correction algorithms: Gamma correction, white balance, linear matrix, etc.
- In combination with multispectral imaging system: demosaicing, etc.

The imaging system SRMSI includes a processor or calculator P and a memory DS containing stored algorithms or programs to carry out the above calculations to determine the reflected spectra, as well as stored data used during these calculations. The processor P is configured to calculate the reflected spectra $R_{pixel}(\lambda_n)$ of the incident electromagnetic radiation from the object OB for each pixel of the image sensor 4 and for a plurality of wavelengths $\lambda_n$ based on Equation 1:

$$V_{pixel}(\varphi_m) = \sum_{n=1}^{N} \underbrace{S(\lambda_n) * I(\lambda_n) * T_{SRTF}(\lambda_n, \varphi_m)}_{A(\lambda_n, \varphi_m)} * R_{pixel}(\lambda_n)$$

where $S(\lambda_n)$ is the sensitivity of the image sensor, $I(\lambda_n)$ is the object illuminant, $T_{SRTF}(\lambda_n, \varphi_m)$ is the transmission spectra of the phase retarder 2 as a function of polarization state angle $\varphi_m$ and $V_{pixel}(\varphi_m)$ is the pixel recorded intensity at each polarization state angle $\varphi_m$, where $A(\lambda_n, \varphi_m) = S(\lambda_n)*I(\lambda_n)*T_{SRTF}(\lambda_n, \varphi_m)$.

The memory or data storage DS, (for example semiconductor memory, HDD, flash memory) is configured to store values for (i) the sensitivity of the image sensor $S(\lambda_n)$, (ii) the object illuminant $I(\lambda_n)$, and (iii) the transmission spectra of the phase retarder also called subwavelength resonating tunable filter $T_{SRTF}(\lambda_n, \varphi_m)$ as a function of polarization state angle $\varphi_m$. The processor P is further configured to calculate the equation $A(\lambda_n, \varphi_m)=S(\lambda_n)*I(\lambda_n)*T_{SRTF}(\lambda_n, \varphi_m)$ based on these stored values, and to carry out the calculation of solving the equation $Vpixel(\varphi_m)=A(\lambda_n, \varphi_m)*Rpixel(\lambda_n)$ to determine the reflected spectra $R_{pixel}(\lambda_n)$.

The processor P is further configured to calculate a multispectral or hyperspectral image based on the determined spectra $R_{pixel}(\lambda_n)$. A program can be included to convert into RGB values (CIE 1931 color space), which were then plotted as RGB image.

The processor P is additionally configured to determine the polarization state angles for a plurality of wavelengths $\lambda_n$ using a corresponding program stored in the memory DS.

The processor P is also configured to solve the equation $Vpixel(\varphi_m)=A(\lambda_n, \varphi_m)*Rpixel(\lambda_n)$, to determine spectra $R_{pixel}(\lambda_n)$. The processor is configured to use the least-squares solving algorithm previously mentioned (equation 2) to determine spectra $R_{pixel}(\lambda_n)$, but can alternatively be configured to use any one of the other solving algorithms disclosed herein.

The memory DS also includes a control program or software which the processor P is configured to execute to controlling rotation of the polarizers and/or imagining device 4.

The tunable optical filter SRTF with angle-independent and broadband transmission properties can thus be used for multispectral or hyperspectral imaging by determining the reflected spectra as set out above.

Multispectral or hyperspectral imaging can thus be carried out by:
  providing incident electromagnetic radiation IR from an object OB to the input polarizer 1 configured to produce linearly polarized electromagnetic radiation;
  providing the linearly polarized electromagnetic radiation having first and second polarization components on two orthogonal axes to the phase retarder 2 configured to carry out a wavelength dependent shift of a phase of the first and/or second polarization component;
  providing the electromagnetic radiation output from the phase retarder 2 to the analyzing polarizer 3 configured to filter the provided electromagnetic radiation at a plurality of different polarization state angles $\varphi_m$ to output electromagnetic radiation having distinct spectral content at each polarization state angle $\varphi_m$; and
  recording, using the image sensor 4 containing a plurality of pixels, an electromagnetic radiation intensity $V_{pixel}(\varphi_m)$ of the electromagnetic radiation output from the analyzing polarizer 3 at a plurality of different polarization state angles.

In the case where the analyzing polarizer 3 and the input polarizer 1 are inverted, multispectral or hyperspectral imaging can be carried out by:
  providing incident electromagnetic radiation from an object OB to the analyzing polarizer 3 configured to filter said provided electromagnetic radiation at a plurality of different polarization state angles $\varphi_m$ to output electromagnetic radiation at each polarization state angle $\varphi_m$;
  providing the output electromagnetic radiation having first and second polarization components on two orthogonal axes to the phase retarder 2 configured to carry out a wavelength dependent shift of a phase of the first and/or second polarization component;
  providing the electromagnetic radiation output from the phase retarder 2 to an output polarizer 1 configured to produce linearly polarized electromagnetic radiation; and
  recording, using the image sensor 4, an electromagnetic radiation intensity $V_{pixel}(\varphi_m)$ of the electromagnetic radiation output from the output polarizer 1 at a plurality of different polarization state angles $\varphi_m$.

The reflected spectra $R_{pixel}(\lambda_n)$ of the incident electromagnetic radiation from the object OB can be calculated for each pixel of the image sensor and for a plurality of wavelengths $\lambda_n$ based on Equation 1. Values for (i) the sensitivity of the image sensor $S(\lambda_n)$, (ii) the object illuminant $I(\lambda_n)$, and (iii) the transmission spectra of the phase retarder $T_{SRTF}(\lambda_n, \varphi_m)$ as a function of polarization state angle $\varphi_m$ are stored and the equation $A(\lambda_n, \varphi_m)=S(\lambda_n)*I(\lambda_n)*T_{SRTF}(\lambda_n, \varphi_m)$ calculated based on these stored values. The calculation of solving the equation $Vpixel(\varphi_m)=A(\lambda_n, \varphi_m)*Rpixel(\lambda_n)$ can be carried out to determine the reflected spectra $R_{pixel}(\lambda_n)$. The multispectral or hyperspectral image can then be calculated based on the determined spectra $R_{pixel}(\lambda_n)$.

Figure 5:
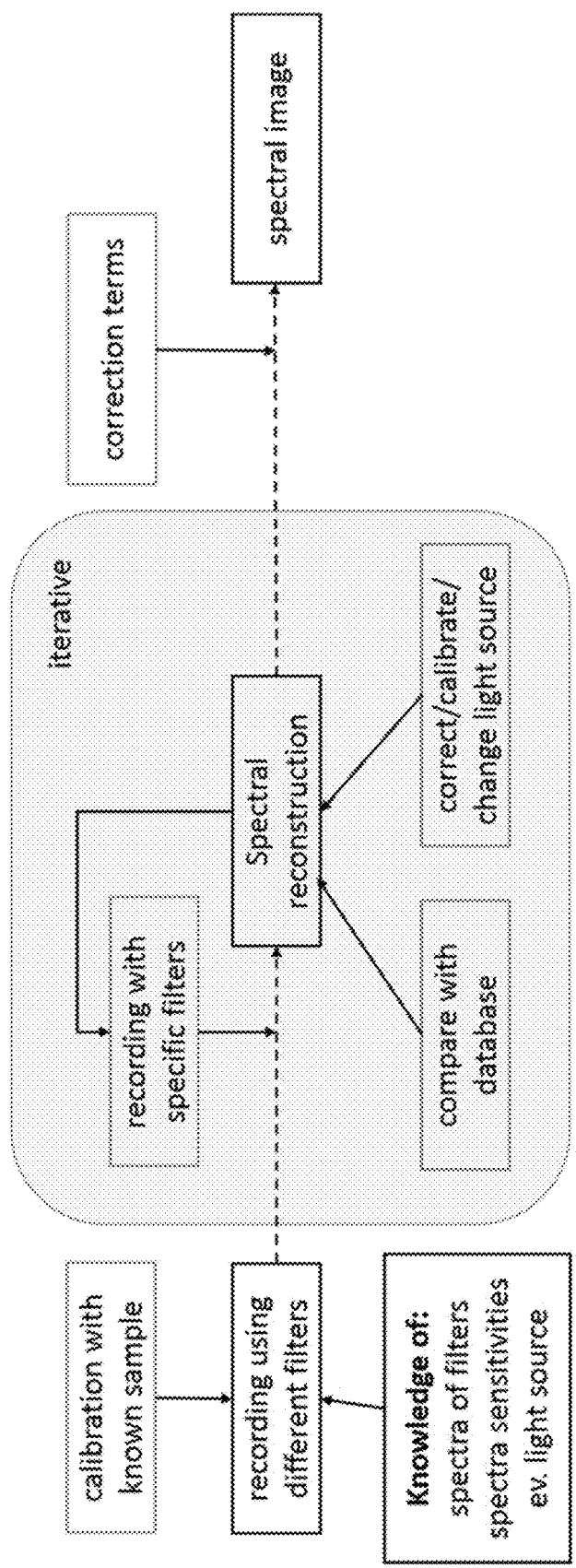
FIG. 5 shows an overview of an exemplary process of image recording and spectral reconstruction.

FIG. 5 shows an overview of an exemplary process of image recording and spectral reconstruction.

The proposed system can be used for many kinds of application areas such as:
  Type: color recording (at full resolution), spectral estimation, singularities detection, imaging at specific wavelengths, polarization imaging.
  Resolution: using a B/W, RGB or multispectral imaging system defines the ratio of spectral versus spatial resolution (requirements depend on applications).
  Applications: Spectral imaging of objects, Monitoring of nutrition, remote sensing, art conservation, medical monitoring, spectral imaging in space, military applications.

A miniaturized SRTF can, for example, be built and used in combination with a smart phone. The integrated flash lamp can serve as a known source, exposure time can be adapted and fixed, and algorithms or programs can determine or estimate the spectral information. The reconstruction range can be selected via touch display to decrease computation time. The SRTF can be powered by the phone itself. This provides a cost-efficient sensor that can be utilized for food monitoring, art analysis, etc.

The system can be configured so that a certain number of filters can be used to measure just certain transmission spectra. For example, by comparing two or more specific filters, one can obtain a pronounced spectral transmission, which can be used to exactly detect certain traces or amounts of reflected light or specific wavelengths, permitting for example to detect specific events, for example, if a plant or plants are alive or not.

The SRTF can, for example, provide many phase shifts at different polarizations. This can be provided by, for example, 2D rectangular plasmonic structures, having different plasmon resonances, each inducing a phase shift. This can enhance the spectral resolution. Furthermore, it could limit certain measurements to specific ranges. This could be used with different imaging devices acting at different ranges, e.g. with a beam splitter.

The disclosed system may also be used as a miniaturized spectrometer by using a photodiode 4 for intensity measurement. To increase spectral resolution, multiple photodiodes 4 with each a broadband filter (e.g. quantum dot, dyes, plasmonic filter) can be used. This provides be a very precise, cost-efficient and angle-independent spectrometer.

The disclosed filtering device SRTF can also be used for calibration of a camera sensor. A light source with known spectra illuminates the camera through the filter system SRTF. This gives a very distinct pattern depending on the light source and could be used in combination with pixelization.

Figure 6:
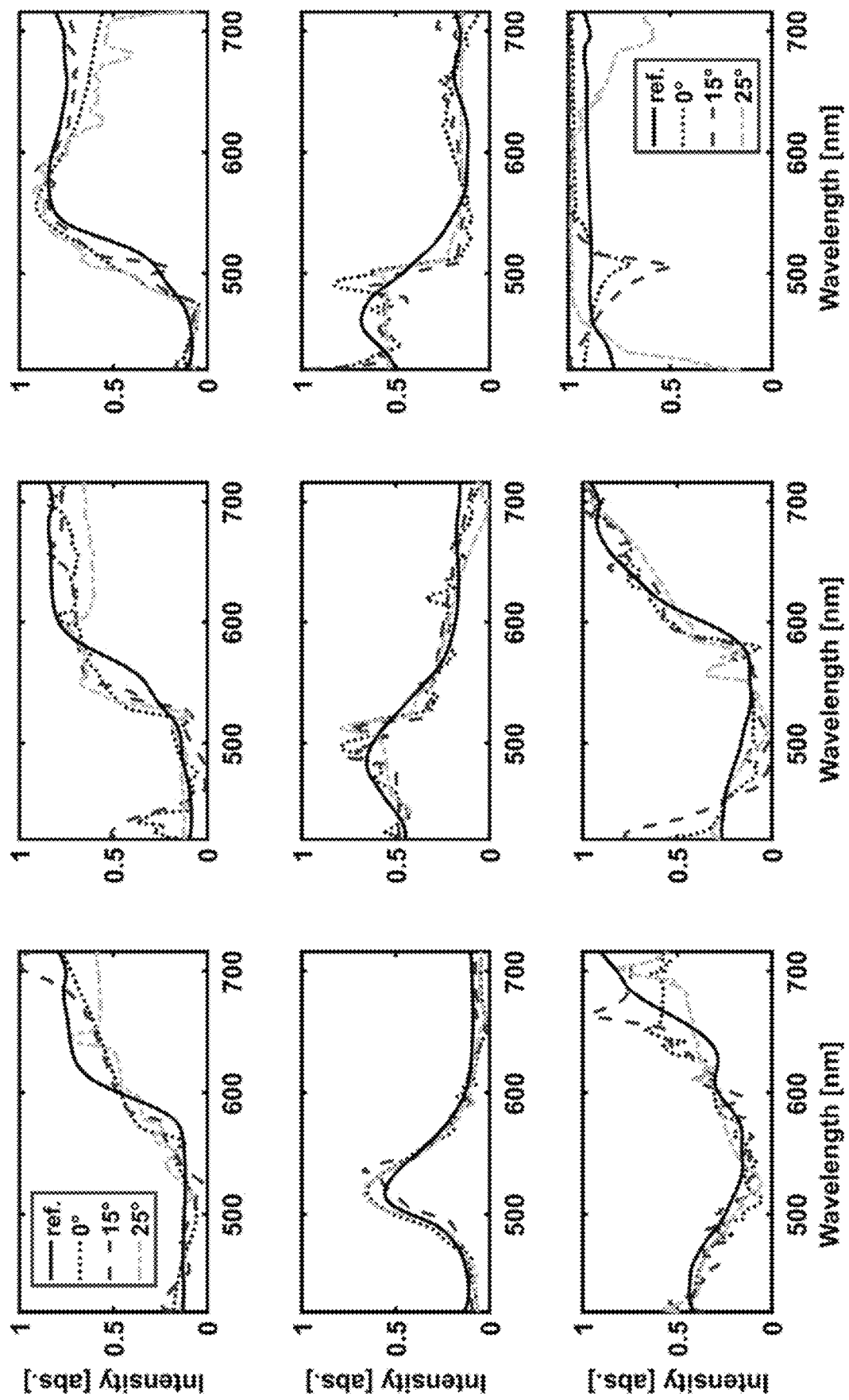
FIG. 6 shows spectral measurements of colored patches (Macbeth ColorChecker) with a spectrometer and those produced by the SRMSI of the present disclosure with the SRTF at tilt angles of $0°$, $15°$ and $25°$; the spectra are converted to colors and the color coordinates are given in FIG. 7.

To verify the spectral reconstruction of the imaging system, a Macbeth ColorChecker was used as a test target. B/W images of colored patches were recorded using the SRFT and a LED light source. The reconstructed spectra were then compared to the spectra measured directly with a conventional spectrometer and indicated as 'ref.' in FIG. 6. To analyze the FOV of the imaging system, the colored patches were recorded and analyzed, while using the SRFT at tilt angles of 0°, 15° and 25°. Overall, as can be seen in FIG. 6, the reconstructed spectra indicate the same trend as the reference measurement; the spectral features (e.g. slopes) are represented at a similar spectral position. Different tilt angles lead to similar results, whereas at an angle of 25° partially a greater mismatch occurs.

Figure 7:
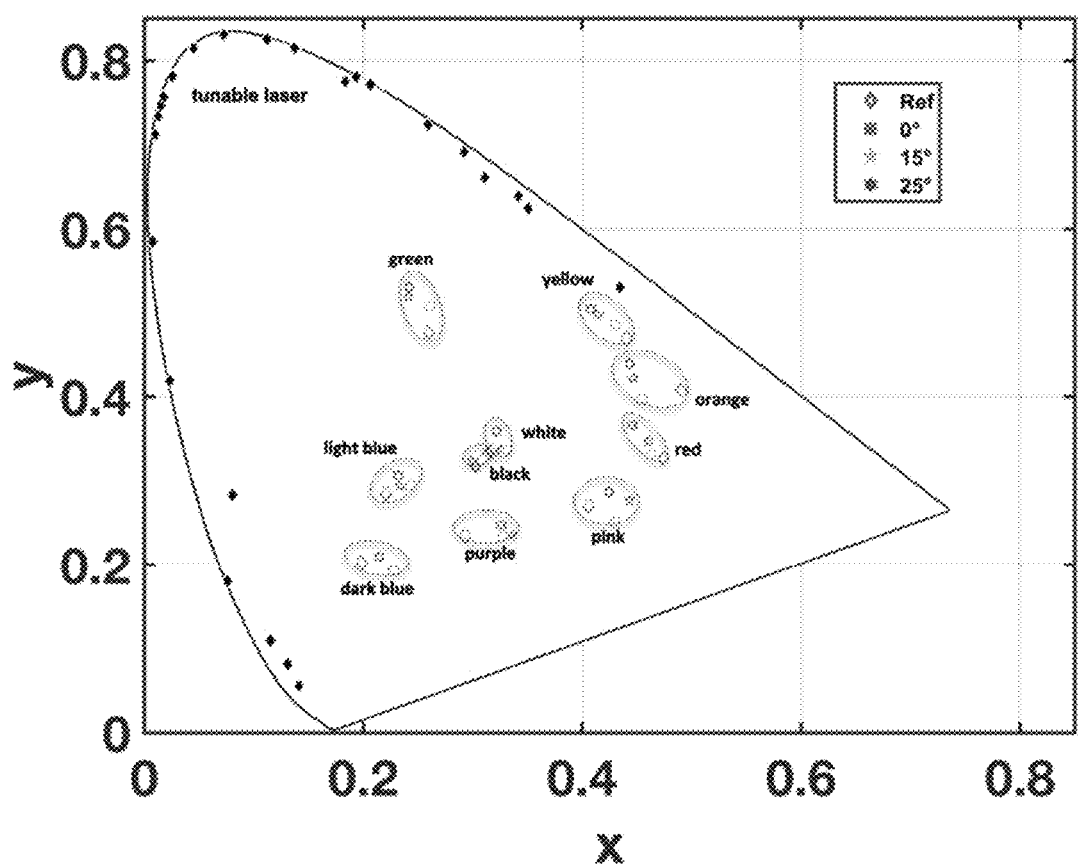
FIG. 7 shows CIE 1931 space including the measured samples. In the ellipse are the angle dependent measurements of the patches including the reference, the black dots indicate the measured position of the laser.

The color representation is very well preserved also for higher tilt angles showing the potentially high FOV and corresponding large aperture. Overall these results indicate that the imaging system functions at least up to an incident angle of 25°, therefore enabling a possible large acceptance angles of at least about 50°. This would correspond to a minimum f-number of f/1.07, which covers the range of conventional lenses. FIG. 7 shows the measured colors at different angles in a CIE plot and FIG. 14 shows a Table displaying the corresponding RMS and color difference (CIE $\Delta E$ 2000).

Imaging experiments were performed with the imaging system SRMSI containing a B/W camera 4 demonstrating the color image recording capability (see FIGS. 15A and 15B). Each recorded pixel of the camera 4 contains information of the spectrum (see FIG. 15C), which can be reconverted into a color pixel displayed in FIG. 15B. The different curves in FIG. 15C show several adjacent pixels to indicate the stability of the spectral reconstruction. A color version of FIG. 15C can be found in the publication Duempelmann, L., Gallinet, B., & Novotny, L. (2017); Multispectral Imaging with Tunable Plasmonic Filters; ACS Photonics, 4(2), 236-241 DOI: 10.1021/acsphotonics.6b01003 the entire contents thereof being herewith incorporated by reference.

In contrast to conventional imaging systems, no further post-processing (e.g. white balance, gamma correction, etc.) on the reconstructed image has been done. Good color representation of the fruits is present in the reconstructed image of FIG. 15B. Overall any object can be monitored with the proposed imaging system, recorded B/W images are converted to a color image with the spectral information at each point while maintaining full spatial resolution. Additionally, besides an estimation (or calibration) of the illuminant, no prior knowledge of the reflection characteristics is required.

For image recording, the filter SRTF was mounted in front of a black/white camera (Baumer TXG14, silicon sensor) with configurable macro lens (Opto Engineering, MC3-03X). The setup was facing an object at a distance of about 50 cm, which was illuminated with a LED screen (Dörr, LP400). Images were recorded with an inhouse LabVIEW (version 2015) script, while controlling the filter angle. To compare the accuracy of the spectral reconstruction, the colored patches of the Macbeth ColorChecker (X-Rite) were measured with the spectrometer directly.

Concerning the reconstruction program or software, the recorded images were imported into an inhouse a MATLAB (version 2016) script. The intensity of the pixels of interest were extracted correspondingly for each used filter angle. For analyzing the color patches, an average of 100×100 pixels was taken. Additionally, the measured spectra of the angle-dependent filter, light source and the sensitivity of the camera was imported. For simplicity reasons, a linear behavior of the camera sensor response was assumed.

Then MATLAB (version 2016) was used to compute an iterative leastsquares fit (command: "lsqlin", see for example mathworks https.//ch.mathworks.com/help/optim/ug/lsqlin.html) with boundary conditions of a certain wavelength range scaling. The solution was limited to positive values only, with the upper boundary limiting it to physical useful values. A smoothness filter was applied to the reconstructed spectra to reduce oscillation effects arising from the illcondition problem.

The resulting spectra can be and were converting into RGB values (CIE 1931 color space, MATLAB script), which were then plotted as RGB image.

To further highlight the spectral recording capabilities, the imaging system was used to measure laser peaks at different spectral positions. Some reconstructed laser lines are shown in FIG. 8B. It was assumed that the reconstruction accuracy was influenced by the local minima and maxima of the filters (see FIG. 8A). Such a strongly defined position could influence the selection of the main eigenvectors specifically to find such unique solution with a high spectral resolution. This allows to distinguish laser peaks separated by 1 nm (even though the filter was recorded with 2 nm resolution), as can be seen in FIG. 8C, demonstrating a high signal-to-noise ratio. FIG. 8D shows a comparison of the measured and expected laser peak position with an overall nice agreement. The slight linear offset could be caused by misalignment of the setup (e.g. polarizer position) or an inaccurate estimation of the sensitivity of the camera. The reconstructed laser peaks show a FWHM of about 4-6 nm, instead of expected ~1-2 nm. This may be caused by the algorithm and its boundary conditions, or caused by dark current of the camera (which was not considered), increasing the minimum measured intensity and therefore leading to a widening of the reconstructed peak. Nevertheless, the capability to record colored images and signatures of lasers without prior knowledge of the sample is demonstrated.

The imaging system of the present disclosure can provide spectral estimation of colored samples and spectral singularities. The accuracy of the spectral estimation depends intrinsically on the design of the filter system. The system can be described by mainly 3 eigenvectors, which would make a larger number of filters redundant. Nevertheless, calculations show that, depending on the measured objects, a higher number of eigenvectors or distinct eigenvectors are useful for a reconstruction with higher accuracy. Therefore, using a large set of filters can add value to the system, besides reducing the noise. On the other hand, research has demonstrated that already 5-8 eigenvectors are sufficient to completely reproduce artworks or e.g. 1269 Munsell chips. Ultimately, there will be a tradeoff between the spectral accuracy and number of filters in relation to the type of sample, which should be measured.

The eigenvectors and corresponding eigenvalues of the filter combined with a B/W camera and a RGB camera are shown in FIGS. 9A, 9B and 10. These figures clearly shows that with a RGB the number of useful eigenvectors (realistic eigenvalue) is increased from 3 to 6.

A functional multispectral imaging system based on homogenous active tunable plasmonic filters and a commercially available black/white camera has thus been demonstrated. Recording of colored objects and laser lines at full spatial resolution and without prior knowledge has been carried out. This includes an estimation of the spectra for each pixel, capable of distinguishing two laser lines separated by 1 nm. A high angle-stability of the plasmonic filter has been shown, allowing recording for example at a large FOV of about 50° by simply mounting the filter SRFT in front of an imaging system. The filter SRFT can be fabricated with standard roll-to-roll techniques, enabling cost-effective manufacturing for a wide range of applications. Combined with a camera containing multispectral arrays (e.g. RGB camera), the spectral resolution and dynamic range can be strongly increased. Non-inverse and adaptable filters for existing imaging system could be a key factor for a wide range of customer applications (e.g. smart phones). The number of used filters in combination with an appropriate spectral estimation algorithm can be adapted in situ depending on the kind of application, e.g. analysis of artworks, remote sensing. Applying this principle as pixelization of the plasmonic filter could increase the spectral resolution while maintaining a high spatial resolution. The rotating polarizer could be exchanged by electrical tunable liquid crystal (see for example FIG. 11 showing an exemplary scheme of how to possibly exchange the mechanical rotation stage by a pure electrical device), enabling integration in miniaturized and lightweight system, e.g. lab-on-a-chip applications.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

The invention claimed is:

1. A tunable optical filter comprising:
an input polarizer for receiving incident electromagnetic radiation incident from an object, the input polarizer being configured to produce linearly polarized electromagnetic radiation propagating in a propagation direction, the linearly polarized electromagnetic radiation having first and second orthogonal electric field components orthogonal to the propagating direction;
a phase retarder arranged to receive the linearly polarized electromagnetic radiation having the first and second electric field components, the phase retarder being configured to carry out a wavelength dependent shift of a phase of the first and/or second electric field components, the phase retarder including at least a plurality of periodically substantially aligned subwavelength elongated structures configured to generate localized surface plasmon resonances or subwavelength dielectric resonances at a first resonance frequency when the first or second polarization component is incident on the phase retarder, and
an analyzing polarizer arranged to receive the electromagnetic radiation output from the phase retarder, the analyzing polarizer configured to filter the received electromagnetic radiation at a plurality of different polarization state angles $\varphi_m$ to output electromagnetic radiation having distinct spectral content at each polarization state angle $\varphi_m$,
wherein the phase retarder is configured to operate in transmission and configured to carry out a wavelength dependent shift of a phase of the first and/or second electric field components to either enhance or weaken an intensity of a sub-range of a wavelength range of the incident electromagnetic radiation transmitted through the analyzing polarizer.

2. A tunable optical filter comprising:
an analyzing polarizer for receiving electromagnetic radiation incident from an object, the analyzing polarizer being configured to filter the incident electromagnetic radiation at a plurality of different polarization state angles $\varphi_m$ and to output electromagnetic radiation at each polarization state angle $\varphi_m$ to output electromagnetic radiation from the tunable optical filter having distinct spectral content at each polarization state angle $\varphi_m$;
a phase retarder arranged to receive, from the analyzing polarizer, linearly polarized electromagnetic radiation propagating in a propagation direction, the linearly polarized electromagnetic radiation having first and second orthogonal electric field components orthogonal to the propagation direction, the phase retarder being configured to carry out a wavelength dependent shift of a phase of the first and/or second orthogonal electric field components, the phase retarder including at least a plurality of periodically substantially aligned subwavelength elongated structures configured to generate localized surface plasmon resonances or subwavelength dielectric resonances at a first resonance frequency when the first or second orthogonal electric field component is incident on the phase retarder, and
an output polarizer arranged to receive the electromagnetic radiation output from the phase retarder, the output polarizer being configured to filter the received electromagnetic radiation to output linearly polarized electromagnetic radiation,
wherein the phase retarder is configured to operate in transmission and is configured to carry out a wavelength dependent shift of a phase of the first and/or second electric field components to either enhance or weaken an intensity of a sub-range of a wavelength range of the incident electromagnetic radiation transmitted and output by the tunable optical filter.

3. The tunable optical filter according to claim 1, wherein the phase retarder is a phase retarder comprising a plurality of periodically substantially aligned subwavelength elongated structures configured to generate localized surface plasmon resonances or subwavelength dielectric resonances at a first resonance frequency and/or at a second resonance frequency.

4. The tunable optical filter according to claim 1, wherein the phase retarder is a plasmonic phase retarder comprising at least a first plurality of periodically substantially aligned subwavelength elongated structures configured to generate localized surface plasmon resonances at first and second resonance frequencies and a second plurality of periodically substantially aligned subwavelength structures configured to generate localized surface plasmon resonances at third and fourth resonance frequencies.

5. The tunable optical filter according to claim 1, wherein the plurality of periodically substantially aligned subwavelength elongated structures includes subwavelength metallic nanostructures having a metallic thickness value in the range of 5 nm to 100 nm, and a separation trench separating the metallic nanostructures having a depth in the range of 30 nm to 250 nm to provide filtering in the visible spectrum.

6. The tunable optical filter according to claim 1, wherein the plurality of periodically substantially aligned subwavelength elongated structures includes a plurality of periodically substantially aligned subwavelength metallic nanostructures including subwavelength metallic nanostructures having a periodic separation in the range of 140 nm to 200 nm to provide an angle independent response of the phase retarder.

7. The tunable optical filter according to claim 1, wherein the plurality of periodically substantially aligned subwavelength elongated structures includes a plurality of periodically substantially aligned subwavelength metallic nanostructures including a first set and a second set of periodically aligned subwavelength metallic nanostructures, the first and second set of periodically aligned subwavelength metallic nanostructures comprising subwavelength metallic nanostructures having a different orientation, and a different metallic thickness value, and a different periodic separation, and a different separation trench depth.

8. The tunable optical filter according to claim 1, wherein the input polarizer, the phase retarder and the analyzing polarizer are connected together to form an integrated compact device; or the analyzing polarizer, the phase retarder and the input polarizer are connected together to form an integrated compact device.

9. The tunable optical filter according to claim 2, wherein the analyzing polarizer, the phase retarder and the output polarizer are connected together to form an integrated compact device.

10. A smart phone or imaging device including the tunable optical filter according to claim 1.

11. A multispectral or hyperspectral imaging system comprising:
the tunable optical filter according to claim 1; and
an image sensor including a plurality of pixels, the image sensor being arranged downstream from the tunable optical filter and is configured to record the electromagnetic radiation intensity $V_{pixel}(\varphi_m)$ of the electromagnetic radiation output from the output polarizer or the analyzing polarizer at each polarization state angle.

12. The multispectral or hyperspectral imaging system according to claim 11, wherein the tunable optical filter is configured to homogenously filter electromagnetic radiation incident on a plurality of pixels of the image sensor.

13. The multispectral or hyperspectral imaging system according to claim 12, wherein the tunable optical filter is configured to homogenously filter electromagnetic radiation incident on the full field of view of the image sensor.

14. The multispectral or hyperspectral imaging system according to claim 11, further including a processor configured to calculate a reflected spectra $R_{pixel}(\lambda_n)$ of the incident electromagnetic radiation from the object for each pixel of the image sensor and for a plurality of wavelengths based on the following equation:

$$V_{pixel}(\varphi_m) = \sum_{n=1}^{N} \underbrace{S(\lambda_n) * I(\lambda_n) * T_{SRTF}(\lambda_n, \varphi_m)}_{A(\lambda_n, \varphi_m)} * R_{pixel}(\lambda_n)$$

where $S(\lambda_n)$ is the sensitivity of the image sensor, $I(\lambda_n)$ is the object illuminant, $T_{SRTF}(\lambda_n, \varphi_m)$ is the transmission spectra of the phase retarder as a function of polarization state angle $\varphi_m$ and $V_{pixel}(\varphi_m)$ is the pixel recorded intensity at each polarization state angle $\varphi_m$, where $A(\lambda_n, \varphi_m) = S(\lambda_n) * I(\lambda_n) * T_{SRTF}(\lambda_n, \varphi_m)$.

15. The multispectral or hyperspectral imaging system according to claim 14, further including a memory configured to store values for (i) the sensitivity of the image sensor $S(\lambda_n)$, (ii) the object illuminant $I(\lambda_n)$, and (iii) the transmission spectra of the phase retarder $T_{SRTF}(\lambda_n, \varphi_m)$ as a function of polarization state angle $\varphi_m$; and wherein the processor is further configured to calculate the equation $A(\lambda_n, \varphi_m) = S(\lambda_n) * I(\lambda_n) * T_{SRTF}(\lambda_n, \varphi_m)$ based on these stored values.

16. The multispectral or hyperspectral imaging system according to claim 15, wherein the processor is further configured to carry out the calculation of solving the equation $Vpixel(\varphi_m) = A(\lambda_n, \varphi_m) * Rpixel(\lambda_n)$ to determine the spectra $R_{pixel}(\lambda_n)$.

17. The multispectral or hyperspectral imaging system according to claim 16, wherein the processor is further configured to calculate a multispectral or hyperspectral image based on the determined spectra $R_{pixel}(\lambda_n)$.

18. The multispectral or hyperspectral imaging system according to claim 11, wherein the image sensor comprises a one-channel or Black and white camera, a RGB camera or a multispectral camera.

19. The multispectral or hyperspectral imaging system according to claim 11, wherein the imaging system is configured to determine the polarization state angles for a plurality of wavelengths $\lambda_n$.

20. A spectrometer comprising:
the tunable optical filter according to claim 1; and
a photodiode arranged downstream from the tunable optical filter and configured to record the electromagnetic radiation intensity of the electromagnetic radiation output from the analyzing polarizer or output polarizer at each polarization state angle.

21. The spectrometer according to claim 20, further including a plurality of photodiodes each associated with a broadband optical filter.

* * * * *